US012793556B2

(12) United States Patent
Duplin

(10) Patent No.: US 12,793,556 B2
(45) Date of Patent: Nov. 10, 2026

(54) HELIDECK FLIGHT PATH TOOL FOR PORTABLE AND INSTALLED AIRCRAFT DISPLAYS

(71) Applicant: Lockheed Martin Corporation, Bethesda, MD (US)

(72) Inventor: Roderick S. Duplin, Downington, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 19/224,660

(22) Filed: May 30, 2025

(65) Prior Publication Data

US 2025/0292690 A1 Sep. 18, 2025

Related U.S. Application Data

(63) Continuation of application No. 17/901,435, filed on Sep. 1, 2022, now Pat. No. 12,400,549.
(Continued)

(51) Int. Cl.
*G08G 5/21* (2025.01)
*B64D 43/00* (2006.01)
(Continued)

(52) U.S. Cl.
CPC ............... *G08G 5/21* (2025.01); *B64D 43/00* (2013.01); *B64D 45/08* (2013.01); *G08G 5/34* (2025.01); *G08G 5/54* (2025.01); *G08G 5/76* (2025.01)

(58) Field of Classification Search
None
See application file for complete search history.

(56) References Cited

U.S. PATENT DOCUMENTS 9,361,691 B2 6/2016 Mohideen et al.
11,417,227 B2 8/2022 Mecklem
(Continued)

FOREIGN PATENT DOCUMENTS

EP 3236213 A2 10/2017

OTHER PUBLICATIONS

European Patent Office Extended European Search Report for application 22195621.2, dated Feb. 2, 2023 (7 pages).

*Primary Examiner* — Brian P Sweeney
*Assistant Examiner* — Jonathan E Reinert
(74) *Attorney, Agent, or Firm* — Michael Best & Friedrich LLP

(57) ABSTRACT

Systems and methods for a helideck approach path tool. One example system includes an electronic processor. The electronic processor is configured to determine a helideck identifier and retrieve, from a database storing data on a plurality of helidecks, helideck data corresponding to the helideck identifier. The helideck data includes a helideck azimuth and at least one obstacle characteristic. The electronic processor is configured to generate a graphical user interface including a helideck approach indicator object, which includes a compass ring, a graphical representation of the helideck aligned to the compass ring based on the helideck azimuth, and an obstacle indicator overlaid on the compass ring based on the at least one obstacle characteristic. The electronic processor is configured to present the graphical user interface on a display within the aircraft.

20 Claims, 18 Drawing Sheets

Related U.S. Application Data

(60) Provisional application No. 63/246,056, filed on Sep. 20, 2021.

(51) Int. Cl.

| | |
|---|---|
| ***B64D 45/08*** | (2006.01) |
| ***G08G 5/34*** | (2025.01) |
| ***G08G 5/54*** | (2025.01) |
| ***G08G 5/76*** | (2025.01) |

(56) References Cited

U.S. PATENT DOCUMENTS

| | | | | |
|---|---|---|---|---|
| 2014/0081484 | A1* | 3/2014 | Covington | B64U 20/87 701/16 |
| 2016/0133138 | A1* | 5/2016 | Oldach | G01S 19/15 701/16 |
| 2017/0309060 | A1 | 10/2017 | Kishore | |
| 2020/0115065 | A1* | 4/2020 | Ando | B64C 27/00 |
| 2022/0136860 | A1* | 5/2022 | Dong | G01C 21/005 701/16 |

* cited by examiner

HELIDECK FLIGHT PATH TOOL FOR PORTABLE AND INSTALLED AIRCRAFT DISPLAYS

CROSS-REFERENCE TO RELATED APPLICATION

The present application is a continuation of the co-pending U.S. patent application Ser. No. 17/901,435, filed Sep. 1, 2022, entitled "HELIDECK FLIGHT PATH TOOL FOR PORTABLE AND INSTALLED AIRCRAFT DISPLAYS," which is related to and claims benefit under 35 U.S.C. § 119(e) from U.S. Provisional Patent Application Ser. No. 63/246,056, filed Sep. 20, 2021, entitled "HELIDECK FLIGHT PATH TOOL FOR PORTABLE AND INSTALLED AIRCRAFT DISPLAYS," the entire contents of which being incorporated herein by reference.

FIELD

Embodiments described herein relate to user interfaces for depicting flight and approach path information and, more particularly, to systems and methods for helideck flight path depiction within user interfaces displayed via portable and installed aircraft displays.

SUMMARY

Offshore helipads and ground level helipads (referred to collectively herein as "helidecks") often have surrounding obstacles that can affect aircraft takeoff and landing. For example, an offshore oil rig may include cranes, towers, and superstructure, all of which can interference with a helicopter's approach to or departure from the helideck. In another example, a helideck on a hospital or corporate building may be situated near portions of buildings, communication towers, or other obstacles. Pilots piloting helicopters must determine an appropriate flight path and escape path (balked landing) to avoid obstacles while considering winds, aircraft performance, and local restrictions (non-fly or noise abatement). However, it may not always be possible to have foreknowledge of such obstacles. Additionally, adverse weather and low light conditions may make it difficult for the pilot to visualize obstacles.

Accordingly, some embodiments described herein provide a Helideck Flight Path Tool (HFPT), which helps pilots understand where obstacles are in relation to the helideck and determine preferred approach paths and escape paths. The HFPT allows pilots to know preferred approach paths and winds and hazards and to plan and visualize their approach path.

DETAILED DESCRIPTION

Figure 1:
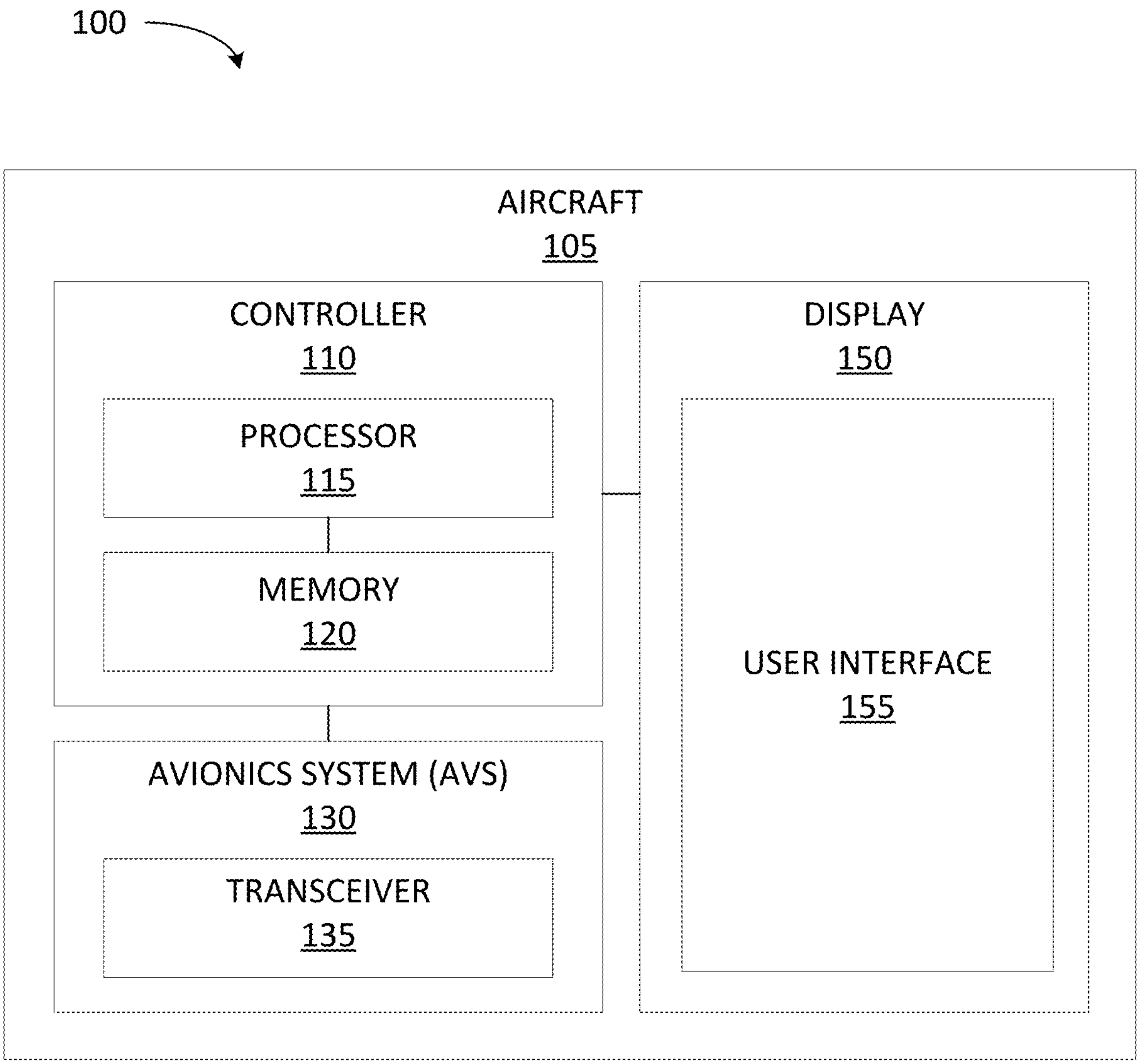
FIG. 1 schematically illustrates an aircraft system with enhanced marine object depiction capabilities, according to some embodiments.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Embodiments described herein provide, among other things, a Helideck Flight Path Tool (HFPT), which helps pilots to understand where obstacles are in relation to the helideck and to determine preferred approach paths and escape paths.

In particular, one example embodiment provides a system for providing situational awareness to a pilot of an aircraft. The system includes an electronic processor. The electronic processor is configured to determine a helideck identifier. The electronic processor is configured to retrieve from a database storing data on a plurality of helidecks, helideck data corresponding to the helideck identifier, the helideck data including a helideck azimuth and at least one obstacle characteristic. The electronic processor is configured to generate a graphical user interface including a helideck approach indicator object. The helideck approach indicator object includes a compass ring, a graphical representation of the helideck aligned to the compass ring based on the helideck azimuth, and an obstacle indicator overlaid on the compass ring based on the at least one obstacle characteristic. The electronic processor is configured to present the graphical user interface on a display within the aircraft.

Another example embodiment provides a method for providing situational awareness to a pilot of an aircraft. The method includes determining, with an electronic processor, a helideck identifier. The method includes retrieving, with the electronic processor, helideck data corresponding to the helideck identifier, the helideck data including a helideck azimuth and at least one obstacle characteristic. The method includes generating a graphical user interface including a helideck approach indicator object including a compass ring, a graphical representation of the helideck aligned to the compass ring based on the helideck azimuth, and an obstacle indicator overlaid on the compass ring based on the at least one obstacle characteristic. The method includes presenting the graphical user interface on a display within the aircraft.

Another example embodiment provides a graphical user interface configured to be displayed on a display of a portable computing device. The graphical user interface includes a helideck approach indicator object including a compass ring, a graphical representation of a helideck aligned to the compass ring based on a helideck azimuth, and an obstacle indicator overlaid on the compass ring based on at least one obstacle characteristic for an obstacle associated with the helideck.

Figure 2:
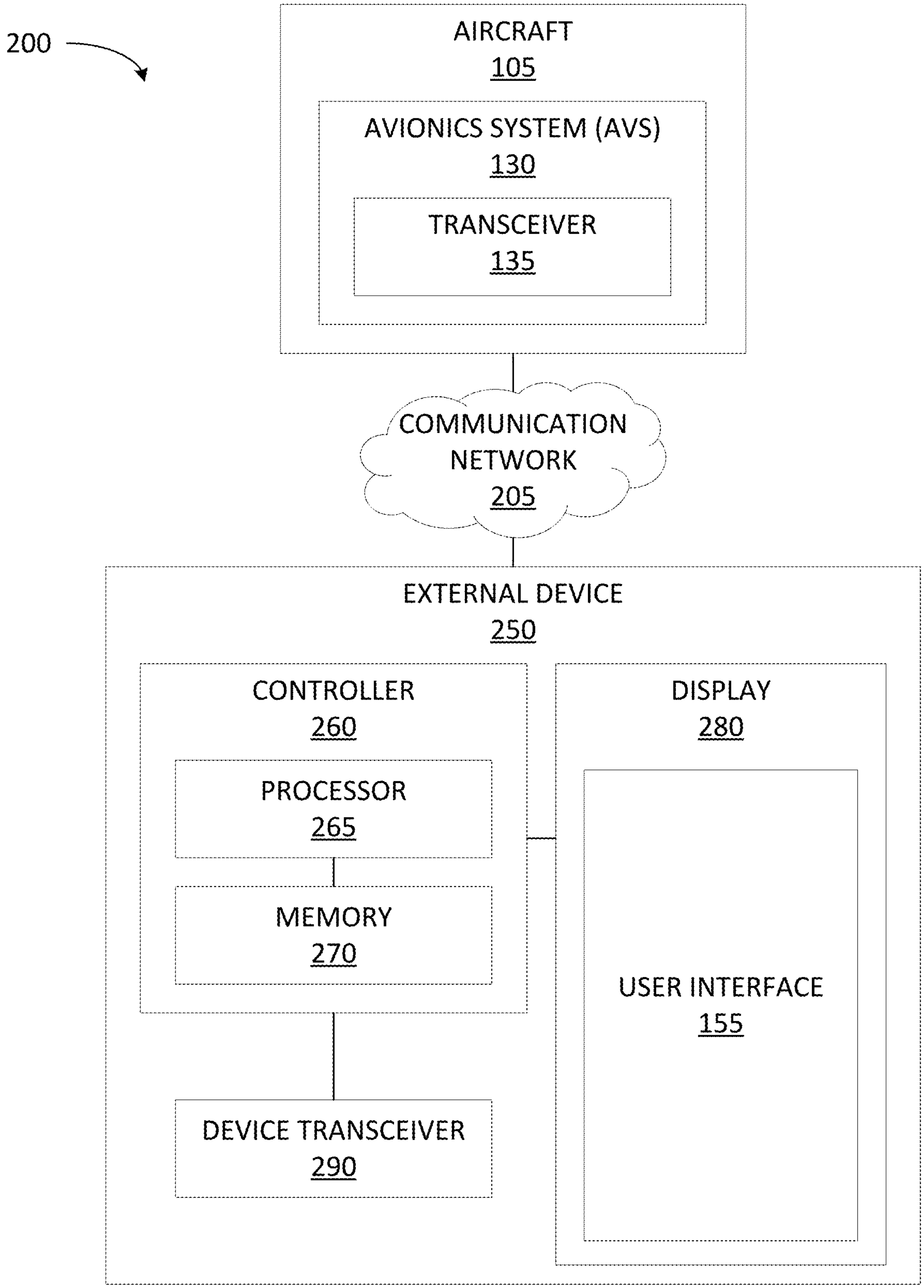
FIG. 2 schematically illustrates an alternative aircraft system with enhanced marine object depiction capabilities, according to some embodiments.

FIG. 1 illustrates a system 100 for providing an EFB application with enhanced marine object identification. According to the embodiment illustrated in FIG. 1, the system 100 is integrated into an aircraft 105. Other embodiments, such as the embodiment illustrated in FIG. 2, are also possible. Returning to FIG. 1, the aircraft 105 includes a controller 110, an avionics system (AVS) 130, and a display 150. The AVS 130 and display 150 may be electrically, mechanically, and/or communicatively coupled to the controller 110. The controller 110 is an electronic controller, which may include a processor 115 and a memory 120. The memory 120 may be a non-transitory computer-readable memory. The memory 120 may include one or more types of memory storage, such as random-access memory (RAM), flash memory, solid-state memory, or hard-drive memory. In addition, or alternatively, the controller 110 may communicate with a cloud-based storage system.

The AVS 130 includes at least a transceiver 135. The transceiver 135 is configured to send and receive radio wave signals to and from other aircraft. The radio wave signals may assist the aircraft 105 in identifying the location and navigational information of other aircraft, such as heading and speed. In some embodiments, the transceiver 135 may be configured to receive signals from marine objects located within a vicinity of the aircraft 105. In these embodiments, the transceiver 135 may be a radar transceiver. In addition, the radio wave signals may relay the location and navigational information of the aircraft 105 to other aircraft. In some embodiments, the transceiver 135 may also be configured to receive data from an automatic identification system (AIS). It is important to note that, for ease of description, the term AIS, as used herein, refers to a particular marine object identification system. However, in some embodiments, marine object identification systems other than AIS may be used. In some embodiments, the AVS 130 may include multiple transceivers 135 configured to perform different communication types, such as an AIS transceiver and a radar transceiver. In these embodiments, the AVS may aggregate data from the multiple transceivers to generate more accurate data. The AIS may assist the aircraft 105 in identifying the location and navigational information of marine objects, such as heading, speed, size, and the like. In these embodiments, the transceiver 135 may be a satellite transceiver, such as an Iridium transceiver. In some embodiments, the AVS 130 may include further systems, including, but not limited to, navigational systems, monitoring systems, aircraft flight-control systems, fuel systems, collision-avoidance systems, flight recorders, weather systems, and aircraft management systems. In some embodiments, the aircraft 105 may not receive location and navigational information of other aircraft from the AVS 130. Instead, the aircraft 105 may receive location and navigational information of other aircraft from a control tower, a cloud-based server, or the like.

In some embodiments, such as the embodiment illustrated in FIG. 1, the display 150 is integrated into the aircraft 105. For example, the display 150 may be electrically coupled to the controller 110, coupled to an instrument panel of the aircraft 105, or included in the AVS 130. In all embodiments, the display 150 provides a user interface 155 for an EFB application. In some embodiments, the display 150 include user input capabilities, such as a touch screen. In some embodiments, the display 150 may be or may include a heads up display (HUD). In some embodiments, the system 100 operates using, among other things, augmented reality technology, where live images are displayed or visible through the display 150 and augmented with text, graphics, or graphical user interface elements superimposed on or otherwise combined with the live images. In some embodiments, the system 100 operates using, among other things, virtual reality technology, where actual or simulated images are displayed (for example, on the display 150) with text, graphics, or graphical user interface elements superimposed on or otherwise combined with the images.

FIG. 2 illustrates an alternative system 200 for providing an EFB application with enhanced marine object identification. Unlike the system 100 illustrated in FIG. 1, the system 200 of FIG. 2 illustrates a distributed configuration. The system 200 may include the aircraft 105, AVS 130, and transceiver 135 of the system 100 of FIG. 1. The system 200 further includes a communication network 205. The communication network 205 may be a Wi-Fi network, a cellular network, a Bluetooth network, a satellite network, or the like. The communication network 205 provides communicative coupling between the aircraft 105 and an external device 250. The external device 250 may be a mobile device, such as a smart phone, a tablet computer, a laptop computer, or the like. In some embodiments, the external device 250 is a device separate from the internal systems of the aircraft 105, but still physically located within the aircraft 105. For example, in these embodiments the external device 250 may be a tablet computer, a mobile phone, or the like. In other embodiments, the external device 250 is located external to the aircraft 105, for example in a control tower.

The external device 250 includes a controller 260, a display 280, and a device transceiver 290. The device transceiver 290 and display 280 may be electrically, mechanically, and/or communicatively coupled to the controller 260. The controller 260 is an electronic controller, which may include a processor 265 and a memory 270. The memory 270 may be a non-transitory computer-readable memory. The memory 270 may include one or more types of memory storage, such as random-access memory (RAM), flash memory, solid-state memory, or hard-drive memory. In addition, or alternatively, the controller 260 may communicate with a cloud-based storage system. The device transceiver 290 is configured to send and receive signals to the aircraft 105 via the communication network 205. In some embodiments, the device transceiver 290 may additionally receive location and navigational information of other aircraft. In some embodiments, the device transceiver may additionally receive marine object information from an automatic identification system (AIS).

In some embodiments, such as the embodiment illustrated in FIG. 2, the display 280 is integrated into the external device 250, and not electrically or mechanically coupled to the aircraft 105. For example, the display 280 may be electrically and communicatively coupled to a mobile device, such as a smart phone or tablet computer. In all embodiments, the display 280 provides a user interface 155 for an EFB application. In some embodiments, the display 280 includes user input capabilities, such as a touch screen. In some embodiments, the display 280 may be a head-mounted display (HMD), an optical head-mounted display (OHMD), or the display of a pair of smart glasses. In some embodiments, the external device 250 operates using, among other things, augmented reality technology, where live images are displayed or visible through the display 280 and augmented with text, graphics, or graphical user interface elements superimposed on or otherwise combined with the live images. In some embodiments, the external device 250 operates using, among other things, virtual reality technology, where actual or simulated images are displayed (for example, on the display 280) with text, graphics, or graphical user interface elements superimposed on or otherwise combined with the images.

Furthermore, other embodiments than the system 100 shown in FIG. 1 and the system 200 shown in FIG. 2 are possible. For example, some embodiments may distribute the components of the system 100 or 200 across multiple devices.

Figure 3:
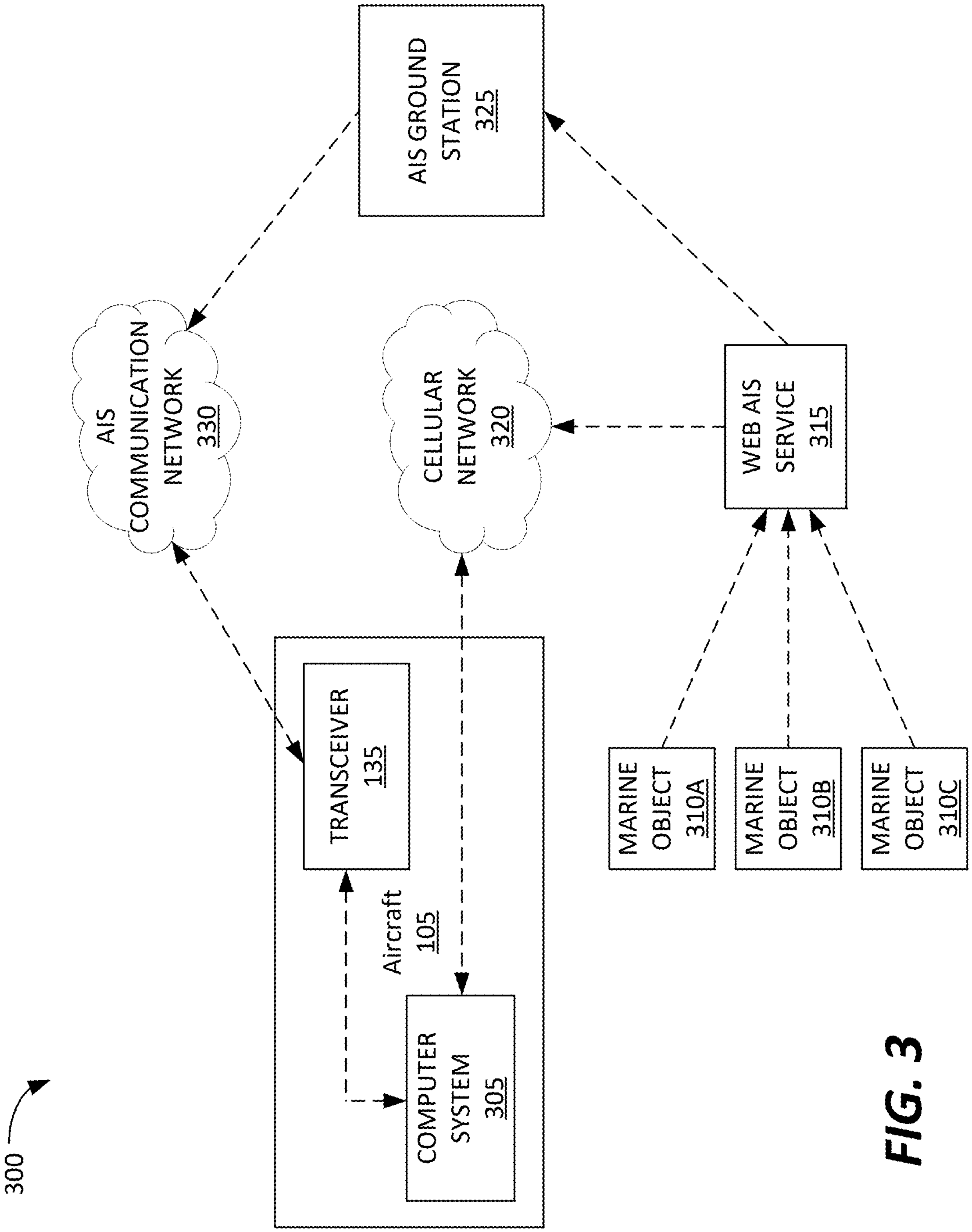
FIG. 3 illustrates a data path of an alternative aircraft system with enhanced marine object depiction capabilities, according to some embodiments.

FIG. 3 illustrates a data path 300 of an alternative aircraft system with enhanced marine object depiction capabilities. The data path 300 includes the aircraft 105 of FIG. 1 or FIG. 2. The aircraft 105 includes a transceiver 135. The transceiver 135 may be configured to send and receive communications over Wi-Fi, cellular networks, Bluetooth, or satellite. In some embodiments, the transceiver 135 is an Iridium satellite transceiver. The aircraft 105 may also include a computer system 305. The computer system 305 may include a processor, a memory, an input, an output, a display, and/or other components. In some embodiments, the computer system 305 may be the controller 110 and/or display 150 of FIG. 1. In other embodiments, the computer system 305 may be the external device 250 of FIG. 2. The computer system 305 may be configured to communicate with the transceiver 135 via a wireless connection, such as a Wi-Fi connection or a Bluetooth connection, or a wired connection.

The data path 300 may also include one or more marine objects 310A-C. The marine objects 310A-C may be boats, ships, oil rigs, aircraft carriers, or the like. The marine objects 310A-C may be stationary or mobile. The marine objects 310A-C may be configured to communicate with a web-based automatic identification system (AIS) service 315 via a wireless communication over Wi-Fi, cellular, Bluetooth, satellite, or the like. In some embodiments, the web AIS service 315 may be provided by an external aviation data provider. The marine objects 310A-C may be configured to send data relating to a navigational status, a rate of turn, a type of cargo, a destination, an estimated time of arrival (ETA), a route plan, and/or safety information of the marine objects 310A-C. The web AIS service 315 may be configured to communicate with the computer system 305 over a cellular network 320. The web AIS service 315 may be further configured to communicate with an AIS ground station 325. The AIS ground station 325 may be an earthbound satellite dish. The AIS ground station 325 may be configured to communicate with the transceiver 135 via a satellite-based AIS communication network 330. Therefore, the aircraft 105 may be able to receive data from an AIS system over multiple networks, such as a cellular network 320 and/or a satellite-based AIS communication network. In some embodiments, the aircraft 105 may be configured to receive data from the AIS service 315 and simultaneously receive signals from a transceiver (for example, the transceiver 135) corresponding to the locations of the marine objects 310A-C. In these embodiments, the aircraft 105 may aggregate the data from the AIS service 315 and the data from the transceiver in order to generate more accurate location data of the marine objects 310A-C.

As noted herein, the AVS 130 may include a radar transceiver for detecting marine traffic. In some embodiments, the radar transceiver generates and sends radar data to the computer system 305. The radar data is indicative of, among other things, the size and location of marine objects (for example, the marine objects 310A-C). The computer system 305 combines the radar data with marine object data received from the AIS service 315 to generate highly accurate location data for the marine objects. For example, the computer system 305 may compare locations for marine objects detected with the radar to locations provided by the AIS service 315 to identify within the AIS data sets the data for marine objects tracked by the AIS service that correspond to the marine objects detected by the aircraft radar.

Figure 4:
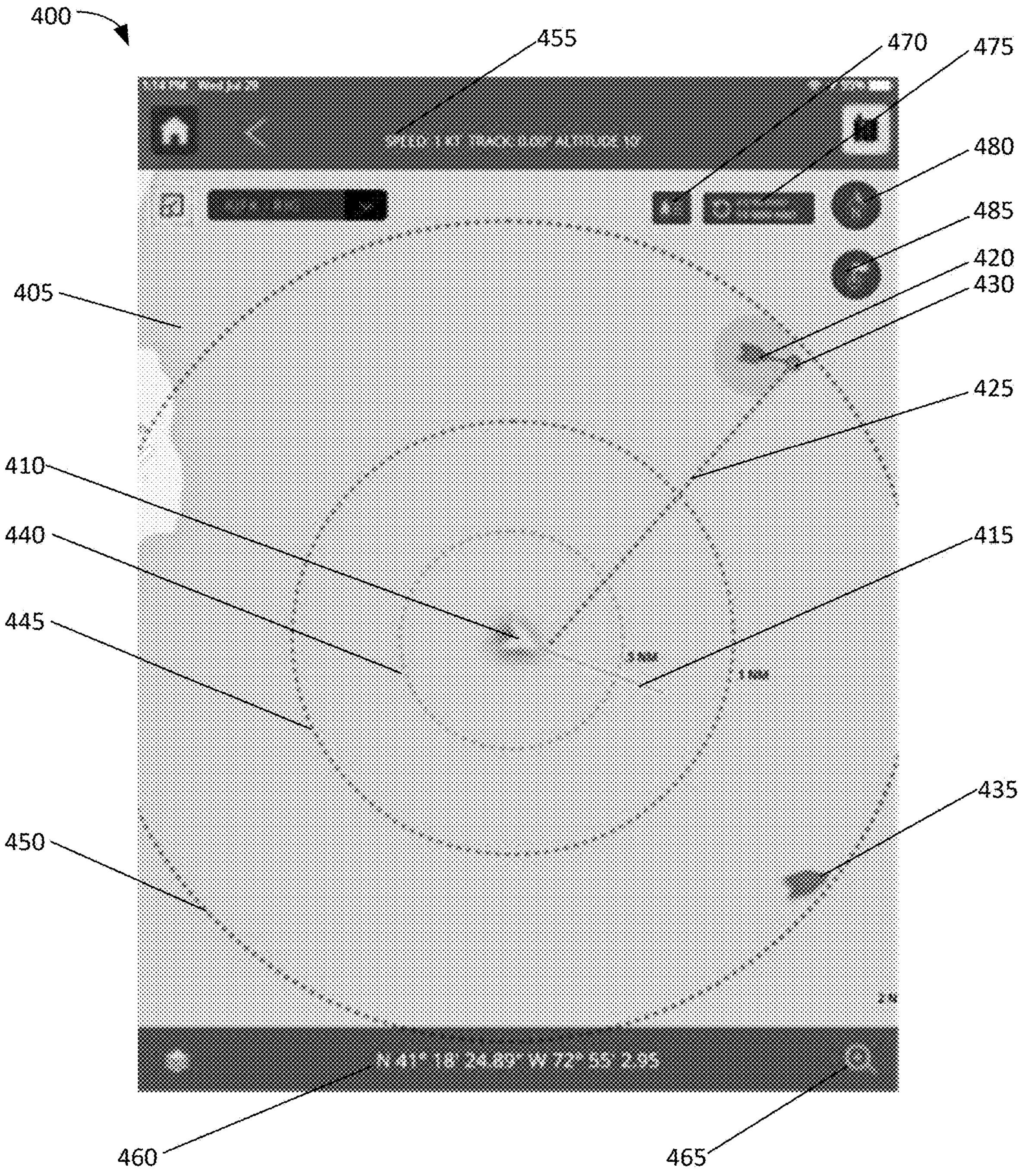
FIG. 4 is an example user interface for depicting a marine object intercept path, according to some embodiments.

FIG. 4 illustrates an example user interface 400 for depicting a marine object intercept path. The user interface 400 may include a map 405 of a travel area of an aircraft. The user interface 400 may further include a first graphical representation 410 of the aircraft and an aircraft trajectory indicator 415. In some embodiments, the aircraft is an ownship (i.e., an aircraft on which the user interface 400 is displayed). In these embodiments, the first graphical representation 410 of the aircraft and the aircraft trajectory indicator 415 may be based on internal location data of the aircraft. The user interface 400 further includes a second graphical representation 420 of a first marine object. The marine object may be a boat, a ship, an oil rig, an aircraft carrier, or the like. In some embodiments, the second graphical representation 420 is depicted within the travel area based on highly accurate location data produced by combining radar data and AIS service data, as noted herein. In such embodiments, the second graphical representation 420 is periodically updated based on changes in the highly accurate location data (for example, as the AIS service updates its data for the first marine object). In some embodiments, the user interface 400 may be configured to provide information related to an intercept operation between the aircraft and the first marine object. In these embodiments, upon receiving confirmation of performing the intercept operation, the user interface 400 may further display an intercept path 425 between the first graphical representation 410 and the second graphical representation 420. The user interface 400 may also display an intercept point 430 at which the aircraft will intercept the first marine object along the intercept path 425. In some embodiments, the user interface 400 may also include a third graphical representation 435 of a second marine object. In some embodiments, the user interface 400 may further include one or more rings indicating a radius around the aircraft. These rings may be centered about the first graphical representation 410. For example, FIG. 4 includes a first ring 440 indicating a radius of 0.5 nautical miles (NM), a second ring 445 indicating a radius of 1 NM, and a third ring 450 indicating a radius of 2 NM.

In some embodiments, the user interface 400 may include additional information relating to the aircraft and additional function buttons. For example, the user interface 400 may include a first information field 455 relating to a speed, track, and altitude of the aircraft and a second information field 460 relating to a latitudinal and longitudinal position of the aircraft. The user interface 400 may also include a zoom button 465 for altering a zoom level of the map 405. The user interface 400 may also include a vessel list button 470 for providing a list of all marine objects within a predetermined radius of the aircraft. The user interface 400 may also include a refresh AIS button 475 for requesting new data to be received from an AIS. The user interface may also include a north indicator 480. The user interface may also include a center button 485 for centering the user interface 400 on a destination of the aircraft, an origin of the aircraft, or a current location of the aircraft.

Figure 5:
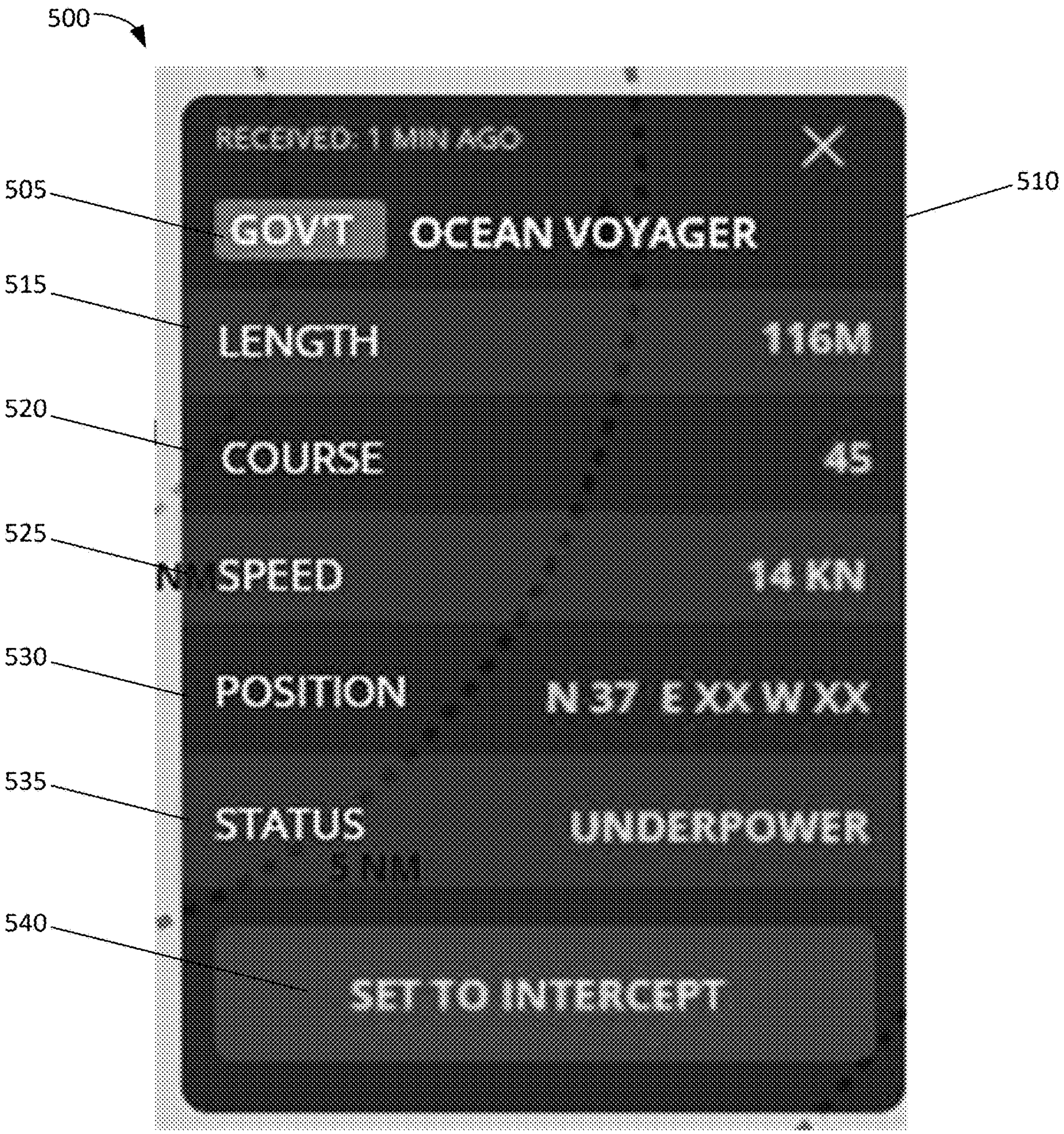
FIG. 5 is an example user interface for depicting marine object data, according to some embodiments.

FIG. 5 illustrates an example user interface 500 for depicting data relating to a marine object. In some embodiments, the user interface 500 may be generated in response to a selection of a representation of a marine object, for example the second graphical representation 420 or the third graphical representation 435 of FIG. 4. The user interface 500 may provide additional details relating to the selected marine object. For example, the user interface 500 may provide one or more fields corresponding to a type 505 (for example, government, civilian, military, etc.), a name 510, a length 515, a course 520, a speed 525, a position 530, and a status 535 of the selected marine object. The user interface 500 may also include an intercept button 540 for setting an intercept course between the aircraft and the selected marine object. In response to a selection of the intercept button 540, the user interface 500 may generate an intercept path and intercept point similar to those illustrated in FIG. 4.

Figure 6A:
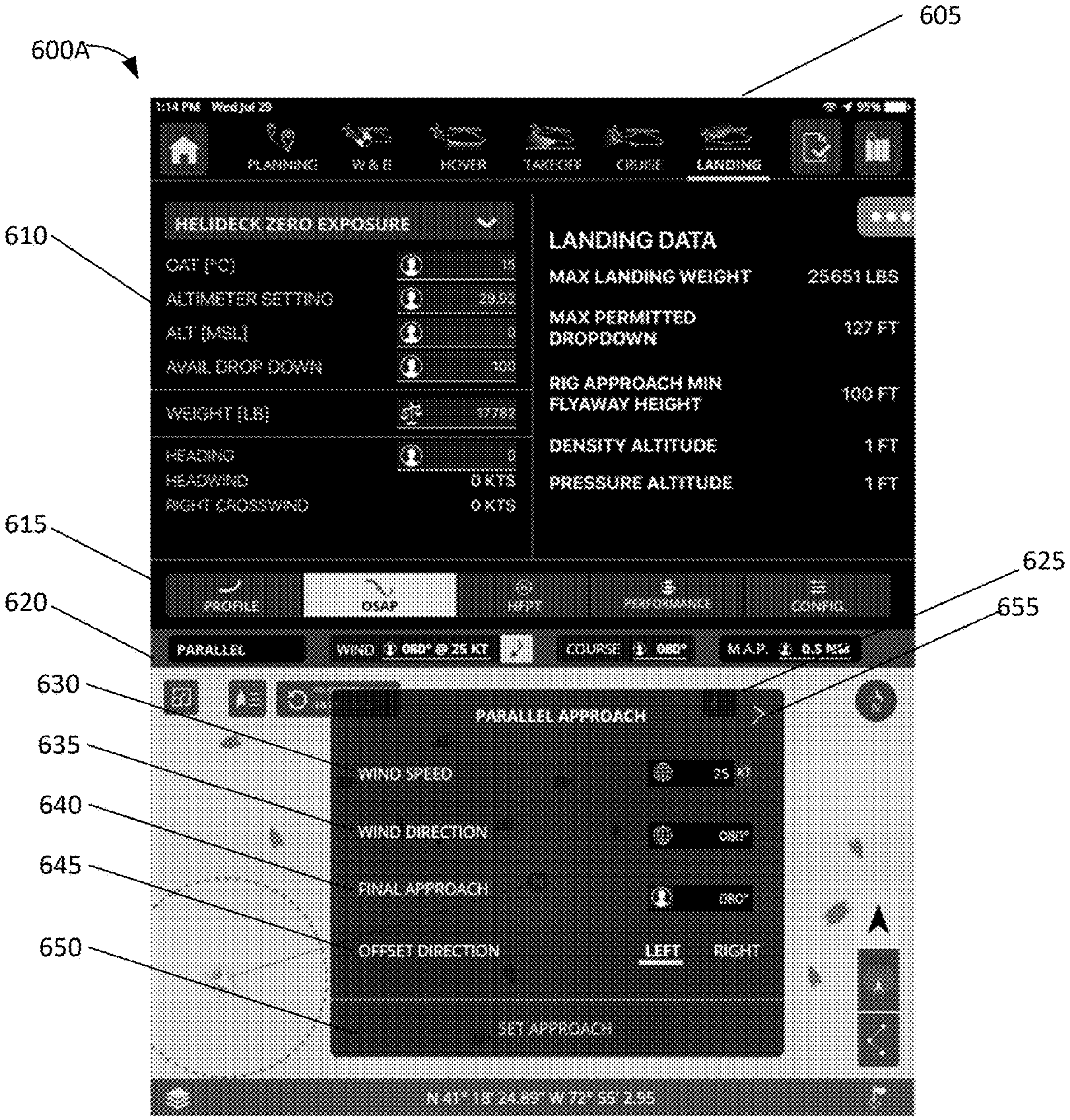
FIG. 6A is an example user interface for selecting an offshore approach path, according to some embodiments.

FIG. 6A illustrates a first example user interface 600A, at a first time, for selecting an offshore approach path. The first example user interface 600A may include a function tab menu 605 including one or more tabs corresponding to different functions of the aircraft. For example, FIG. 6A illustrates a planning tab, a W&B (weight and balance) tab, a hover tab, a takeoff tab, a cruise tab, and a landing tab. In FIG. 6A the landing tab selected. The first example user interface 600A may also include a settings panel 610 related to the selected tab for viewing or setting data related to the corresponding function. The settings panel 610 may further include an operation selection menu 615 for selecting a certain operation of the aircraft. For example, FIG. 6A illustrates a profile button, an offshore approach path (OSAP) button, a helideck flight path tool (HFPT) button, a performance button, and a configuration button, with the OSAP button selected.

Upon a selection of a button from the operation selection menu 615, a traffic display panel 620 of the first example user interface 600A may transform to display a window corresponding to the selected button. For example, in response to the OSAP button being selected, an OSAP parameters entry window 625 may be generated. The OSAP parameters entry window 625 may include one or more fields for entering OSAP parameters. For example, the OSAP parameters entry window 625 may include a wind speed field 630, a wind direction field 635, a final approach field 640, and/or an offset direction field 645. The OSAP parameters entry window 625 may further include set approach button 650. In response to receiving a user input related to the set approach button 650, the traffic display panel 620 may be configured to generate an OSAP overlay. In some embodiments, a user may be prevented from activating the set approach button 650 until data has been entered into one or more of the fields. The OSAP parameters entry window 625 may further include an additional parameters arrow 655. In response to receiving a user input indicative of a user pressing the additional parameters arrow 655, the OSAP parameters entry window 625 may transform to include different fields.

Figure 6B:
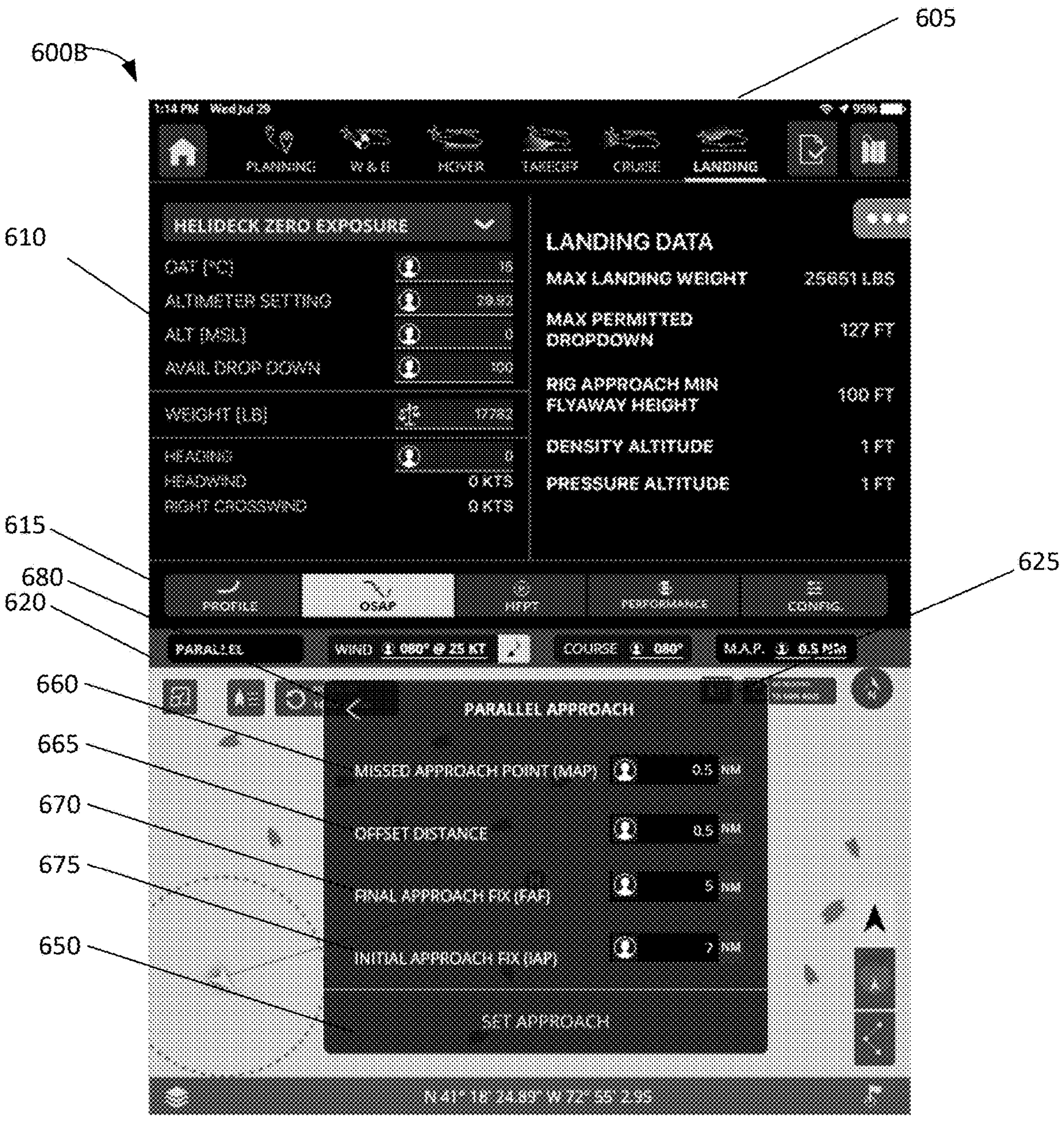
FIG. 6B is an example user interface for depicting an offshore approach path, according to some embodiments.

FIG. 6B illustrates a second example user interface 600B, at a second time, for selecting an offshore approach path. The second example user interface 600B may include similar elements as the first example user interface 600A, such as the function tab menu 605, the settings panel 610, the operation selection menu 615, the traffic display panel 620, and the OSAP parameters entry window 625. In some embodiments, the second example user interface 600B may be generated in response to a user selection of the additional parameters arrow 655 of the first example user interface 600A. In these embodiments, the OSAP parameters entry window 625 of the second example user interface 600B may transform to include different OSAP parameter fields. For example, as illustrated by FIG. 6B, the OSAP parameters entry window 625 includes a missed approach point field 660, an offset distance field 665, a final approach fix field 670, and/or an initial approach fix field 675. The OSAP parameters entry window 625 may further include the set approach button 650. The OSAP parameters entry window 625 may further include a previous parameters arrow 680. In response to receiving a user input indicative of a user selecting the previous parameters arrow 680, the OSAP parameters entry window 625 may transform to include the same fields as discussed herein with respect to FIG. 6A.

Figure 7A:
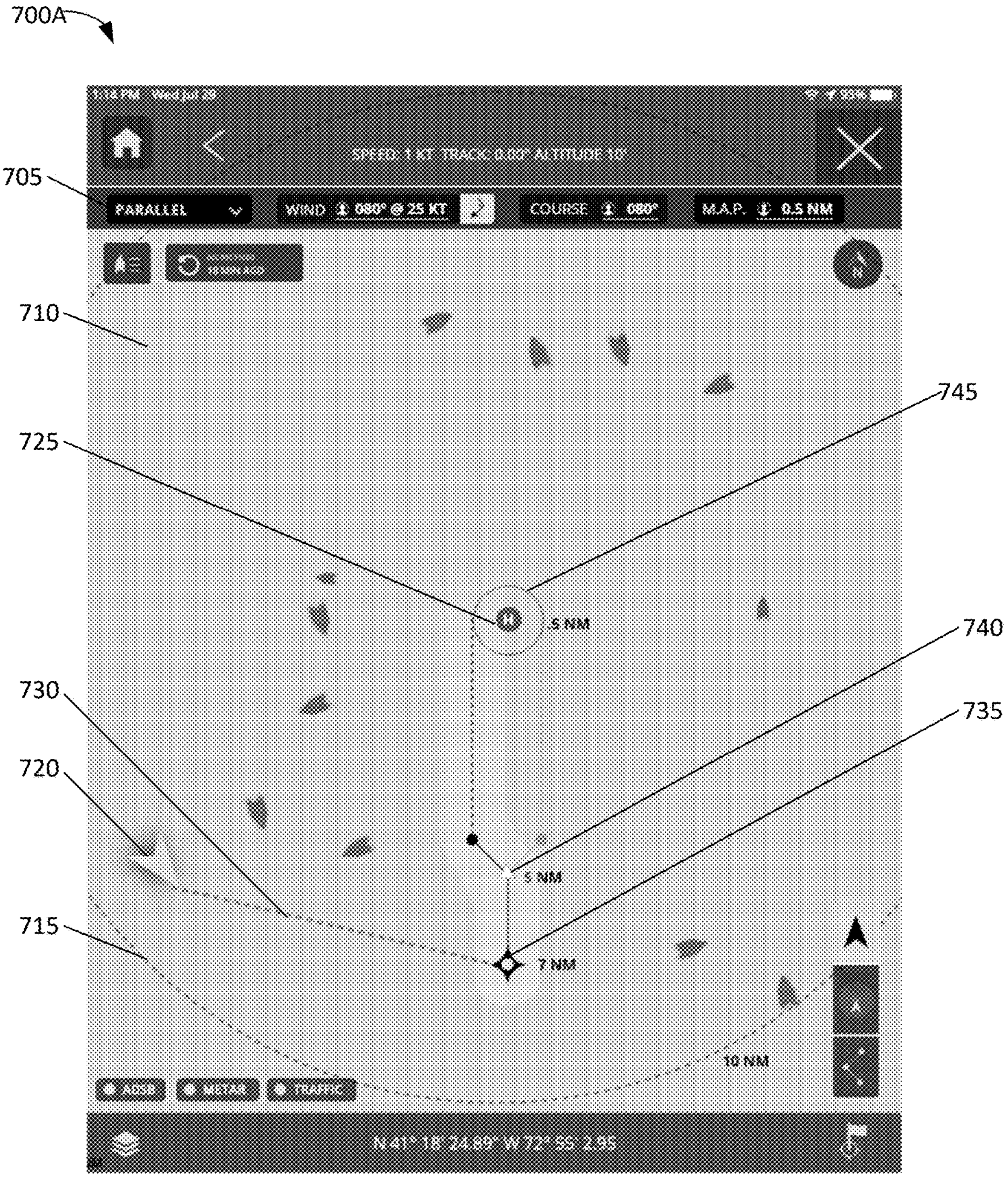
FIG. 7A is an example user interface for depicting an offshore approach path, according to some embodiments.

FIG. 7A illustrates a third example user interface 700A, at a third time, for depicting an offshore approach path. The third example user interface 700A may be generated in response to a selection of the set approach button 650 of FIG. 6A or 6B. The third example user interface 700A may include an approach path type menu 705. The approach path type menu may include one or more options of different approach paths. The third example user interface 700A may depict an approach path based on a selection of the approach path type menu 705. As illustrated in FIG. 7A, the selection is a Parallel approach path. The third example user interface 700A may further include a map 710 of a travel area of an aircraft, and an outer ring 715 illustrating an operating range of the aircraft. The third example user interface 700A may further include a first graphical representation 720 of the aircraft and a second graphical representation 725 of a marine objected selected by an operator of the aircraft as a landing zone. The third example user interface 700A may further include a flight path 730 between the first graphical representation 720 and an approach path start point 735 to direct an operator of the aircraft to the approach path start point 735. The third example user interface 700A may further include a depiction of an approach path 740 between the approach path start point 735 and the second graphical representation 725, based on the selection of the approach path type menu 705 and a predetermined radius 745 of the selected marine object. As illustrated in FIG. 7A, the depiction of the approach path 740 is a depiction of a Parallel approach path.

Figure 7B:
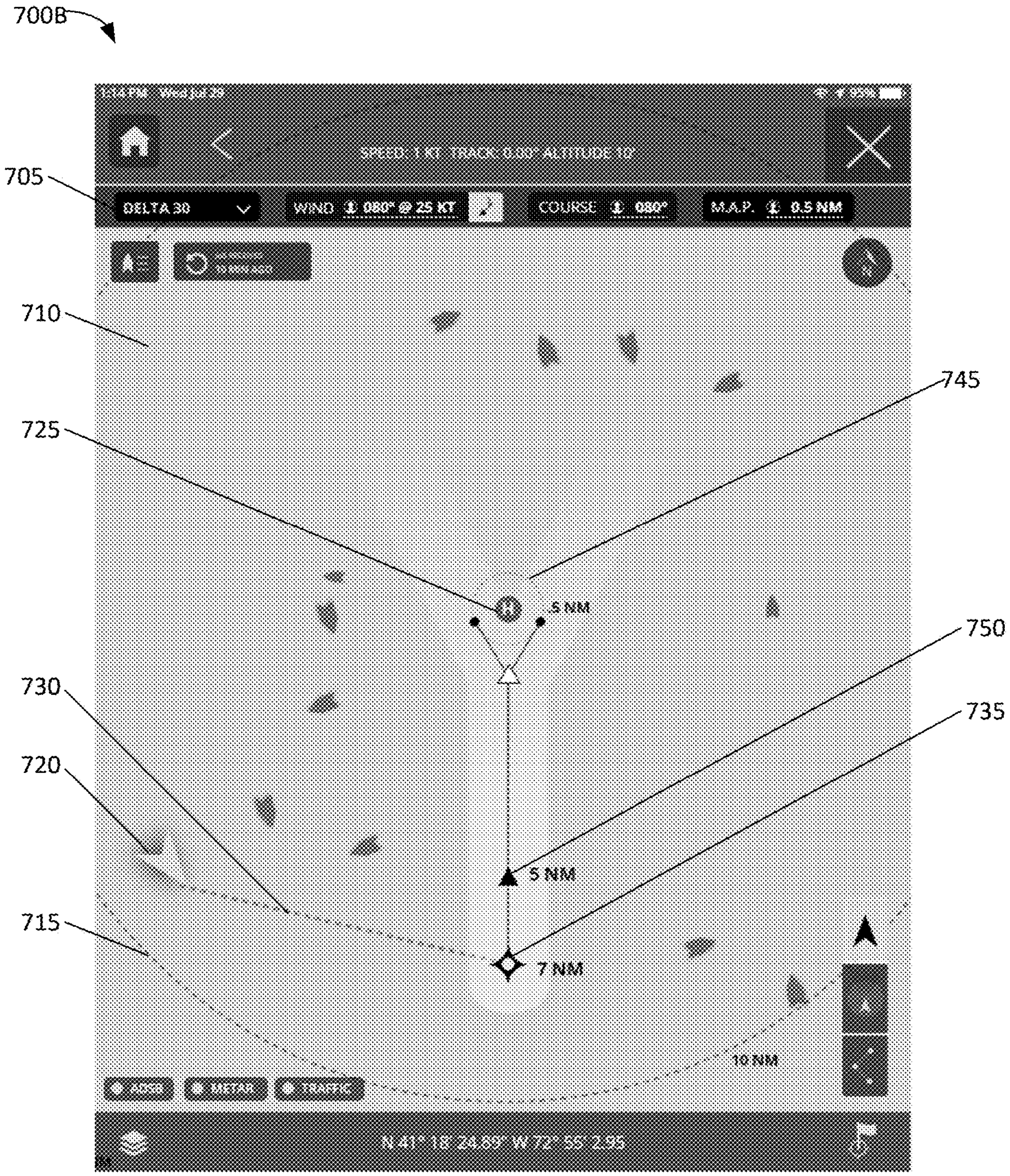
FIG. 7B is an example user interface for depicting an offshore approach path, according to some embodiments.

FIG. 7B illustrates a fourth example user interface 700B, at a fourth time, for depicting an offshore approach path. The fourth example user interface 700B may be generated in response to a selection of the set approach button 650 of FIG. 6A or 6B. The fourth example user interface 700B may include similar elements as the third example user interface 700A, such as the approach path type menu 705, the map 710 of the travel area of the aircraft, the outer ring 715 illustrating an operating range of the aircraft, the first graphical representation 720 of the aircraft, the second graphical representation 725 of a marine objected selected by an operator of the aircraft as a landing zone, and the flight path 730 between the first graphical representation 720 and the approach path start point 735 to direct an operator of the aircraft to the approach path start point 735. In some embodiments, the fourth example user interface 700B may be generated in response to changing the selection of the approach path type menu 705. For example, as illustrated in FIG. 7B, the selection is a Delta-30 path. The fifth example user interface 700B may further include a depiction of an approach path 750 between the approach path start point 735 and the second graphical representation 725, based on the selection of the approach path type menu 705 and the predetermined radius 745 of the selected marine object. As illustrated in FIG. 7B, the depiction of the approach path 750 is a depiction of a Delta 30 approach path.

Figure 7C:
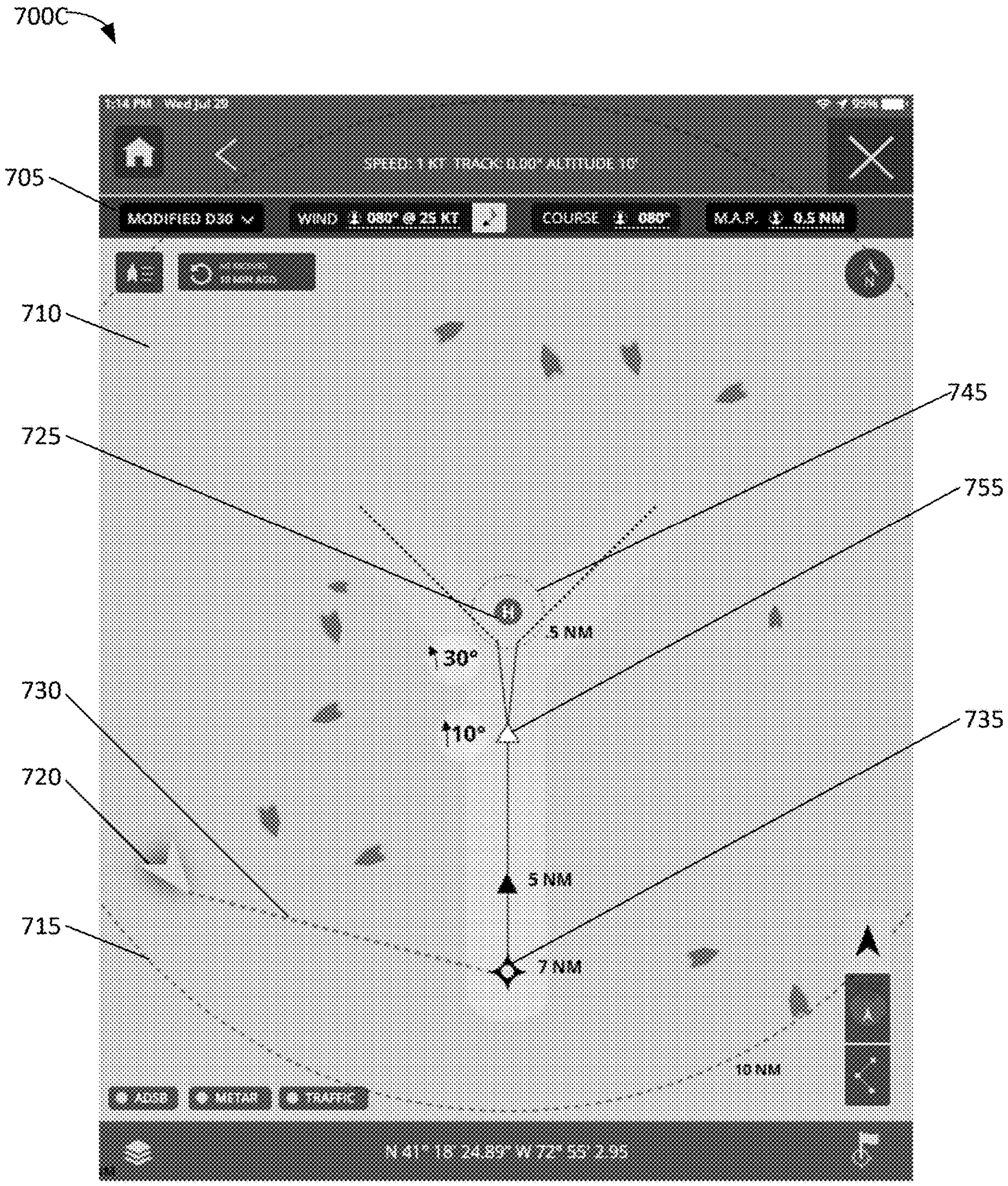
FIG. 7C is an example user interface for depicting an offshore approach path, according to some embodiments.

FIG. 7C illustrates a fifth example user interface 700C, at a fifth time, for depicting an offshore approach path. The fifth example user interface 700C may be generated in response to a selection of the set approach button 650 of FIG. 6A or 6B. The fifth example user interface 700C may include similar elements as the third example user interface 700A, such as the approach path type menu 705, the map 710 of the travel area of the aircraft, the outer ring 715 illustrating an operating range of the aircraft, the first graphical representation 720 of the aircraft, the second graphical representation 725 of a marine objected selected by an operator of the aircraft as a landing zone, and the flight path 730 between the first graphical representation 720 and the approach path start point 735 to direct an operator of the aircraft to the approach path start point 735. In some embodiments, the fifth example user interface 700C may be generated in response to changing the selection of the approach path type menu 705. For example, as illustrated in FIG. 7C, the selection is a modified Delta-30 path. The fifth example user interface 700C may further include a depiction of an approach path 755 between the approach path start point 735 and the second graphical representation 725, based on the selection of the approach path type menu 705 and the predetermined radius 745 of the selected marine object. As illustrated in FIG. 7C, the depiction of the approach path 755 is a depiction of a modified Delta 30 approach path.

Figure 8:
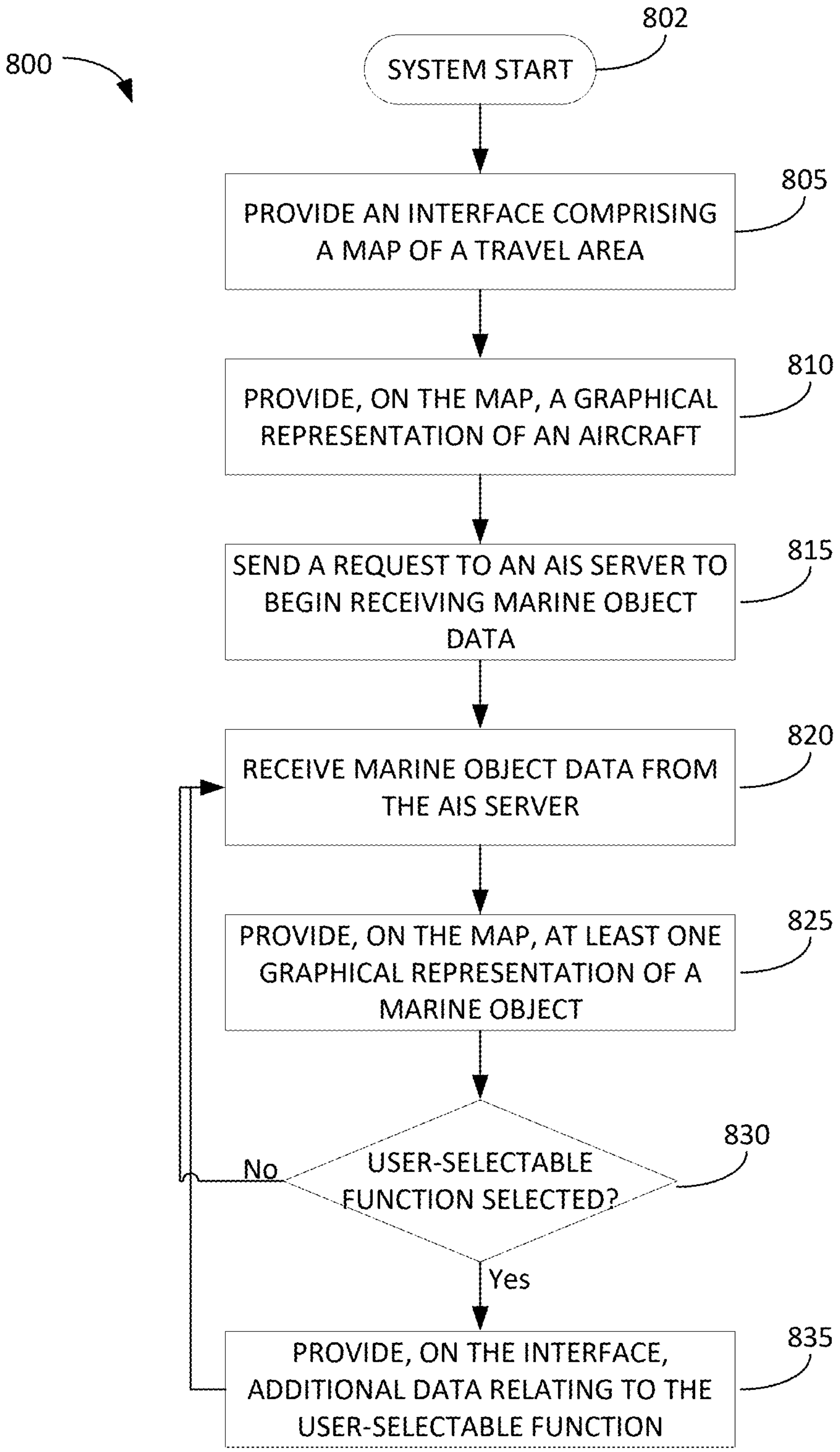
FIG. 8 is a flowchart illustrating a method of providing a user interface with enhanced marine object depiction capabilities, according to some embodiments.

FIG. 8 illustrates a flowchart illustrating a method 800 of providing a user interface with enhanced marine object depiction capabilities. The method 800 begins once a system implementing the method, such as the system 100 for providing an EFB application with enhanced marine object identification of FIG. 1 or the system 200 for providing an EFB application with enhanced marine object identification of FIG. 1, begins operation (BLOCK 802). The method 800 includes providing, on a display of the system, an interface comprising a map of a travel area of an associated aircraft (BLOCK 805). In some embodiments, the associated aircraft may be an aircraft connected to the system. The method 800 also includes providing, on the map, a graphical representation of the aircraft (BLOCK 810).

As described herein with respect to FIG. 1 and FIG. 2, the system may be in communication with an automatic identification system (AIS). The method may further include sending, via a transceiver, a request to an AIS server to begin receiving marine object data within a predetermined area of the aircraft (BLOCK 815). The transceiver may be configured to send the request to the AIS server over a Wi-Fi network, a cellular network, a satellite network, or a different wireless or wired communication network. In some embodiments, the request to begin receiving marine object data is only sent once. In other embodiments, the request to begin receiving marine object data is sent at regular intervals, for example every 15 seconds. Once the request has been sent and received by the AIS server, the method 800 includes receiving marine object data from the AIS server (BLOCK 820). The marine object data may be received by the transceiver at regular intervals (for example, every minute, every 10 seconds, every second, etc.).

The method 800 further includes providing, on the map, one or more graphical representations of a marine object (BLOCK 825). At least one graphical representation may be based on the marine object data received from the AIS server. At least one graphical representation may be periodically updated, for example, at intervals corresponding to an interval at which data is received from the AIS server. In some embodiments, there may be no marine objects located within an area of the aircraft, and therefore no graphical representations of marine objects may be displayed. The method further includes determining if one of at least one user-selectable function has been selected (BLOCK 830).

The user selectable function may include an offshore approach path (OSAP) function, which provides a user with a depiction of an approach path from the aircraft to a selected marine object while in an offshore environment; a search-and-rescue (SAR) function, which directs a user to an area with a marine object in distress and provides the user with a search pattern to locate the marine object in distress; a marine object intercept function, which provides a user with a flight path to intercept a selected marine object; an aircraft ditching assistance function, which provides a user with a flight path to a landing point near a selected marine object and activates a beacon once the aircraft has landed; an airborne delivery function, which directs an operator of the aircraft to an intercept point near a selected marine object and instructs the operator to either land, drop, or hoist a package on the marine object; a return-to-home function, which provides a user with a flight path to a home marine object; a coastal patrol function, which provides a user with a coastal patrol plan; a pirate patrol function, which provides a user with a pirate patrol plan and information relating to pirate activity; a policing function, which provides a user with a policing patrol plan; a safety function, which can direct an operator of an aircraft to a friendly marine object; and an avoidance function, which provides a user with a path to avoid a specified area. If the method 800 determines that a user-selectable function has been selected, the method 800 further includes providing, on the interface, additional data relating to the selected user-selectable function (BLOCK 835). The method 800 then returns to BLOCK 820. In some embodiments, the method 800 returns to a block other than BLOCK 820. If the method 800 determines that a user-selectable function has not been selected, the method returns to BLOCK 820. In some embodiments, the method 800 returns to a block other than BLOCK 820.

Figure 9:
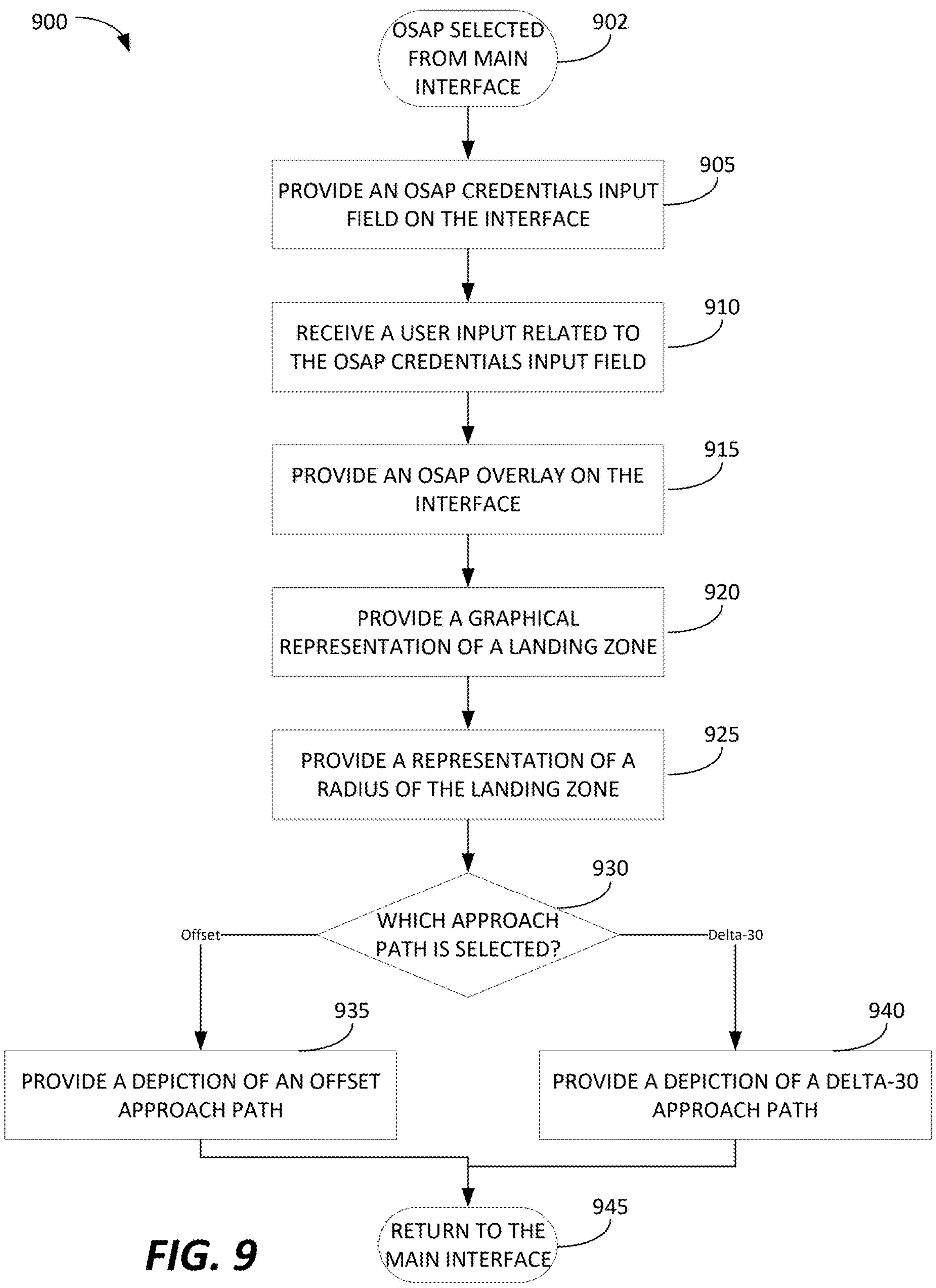
FIG. 9 is a flowchart illustrating a method of providing a user interface with an offshore approach path overlay, according to some embodiments.

FIG. 9 illustrates a flowchart illustrating a method 900 of providing a user interface with an offshore approach path overlay. The method 900 begins when a system detects that an OSAP function has been selected from a main interface (for example, in BLOCK 830 of method 800) (BLOCK 902). If an OSAP function has been selected, the method 900 includes providing at least one OSAP parameters input field on the interface (BLOCK 905). The method 900 then includes receiving a user input related to the OSAP parameters input field (BLOCK 910). Once the input has been received, the method includes providing an OSAP overlay on the interface (BLOCK 915), providing a graphical representation of a landing zone (BLOCK 920), and providing at least one representation of a radius around the landing zone (BLOCK 925).

The method 900 then determines what type of OSAP procedure has been selected (BLOCK 930). If an Offset procedure has been selected, the method 900 includes providing a depiction of an Offset approach path on the interface (BLOCK 935). If a Delta-30 procedure has been selected, the method 900 includes providing a depiction of a Delta-30 approach path on the interface (BLOCK 940). In some embodiments, the selectable OSAP procedures may include a modified Delta-30 procedure. In these embodiments if the modified Delta-30 procedure has been selected, the method 900 includes providing a depiction of a modified Delta-30 approach path on the interface. In some embodiments, other OSAP procedures beyond Offset, Delta-30, and modified Delta-30 may be included in the selectable OSAP procedures. Following either BLOCK 935 or BLOCK 940, the method 900 ends and returns to a main interface (for example, BLOCK 820 of the method 800) (BLOCK 945). In some embodiments, the method 900 may return to a previous block in the method 900 or wait for a user to exit the OSAP function before returning to the main interface.

In some embodiments, for example, where the method 900 is implemented on an external device 250 as described herein, the OSAP procedures are used to automatically execute a flight plan. In such embodiments, the controller 260 develops a flight plan for the aircraft using the selected OSAP procedure. The flight plan is exported to a flight management system of the aircraft (for example, to the AVS 130 via the communication network 205 using a suitable communication protocol), such that the aircraft can fly the procedure without the pilot having to make duplicate entries into the flight management system. In some embodiments, the system is configured to automatically create and execute the flight plan upon selection of the OSAP procedure. In some embodiments, the user interface 155 provides additional user inputs for initiating the automated flight plan based on the selected OSAP procedure.

Figure 10:
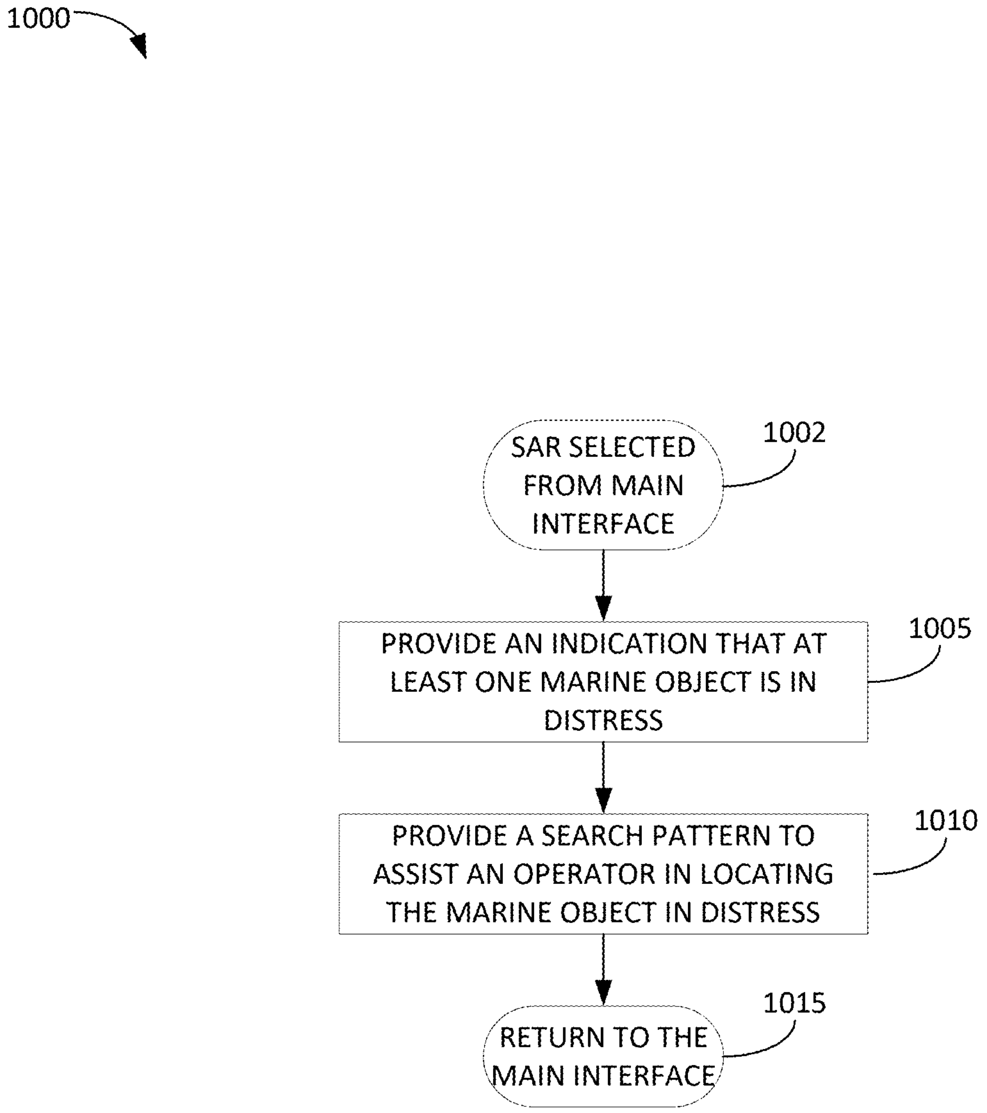
FIG. 10 is a flowchart illustrating a method of providing a user interface with a search and rescue overlay, according to some embodiments.

FIG. 10 illustrates a flowchart illustrating a method 1000 of providing a user interface with a search and rescue overlay. The method 1000 begins when a system detects that a search and rescue (SAR) function has been selected from a main interface (for example, in BLOCK 830 of method 800) (BLOCK 1002). If a SAR function has been selected, the method 1000 includes providing, on the interface, an indication that at least one marine object within an area of the aircraft is in distress (BLOCK 1005). The method 1000 may further include providing a search pattern to assist an operator of the aircraft in locating the marine object in distress (BLOCK 1010). Following BLOCK 1010, the method 1000 ends and returns to a main interface (for example, BLOCK 820 of the method 800) (BLOCK 1015). In some embodiments, the method 1000 may return to a previous block in the method 1000 or wait for a user to exit the SAR function before returning to the main interface.

Figure 11:
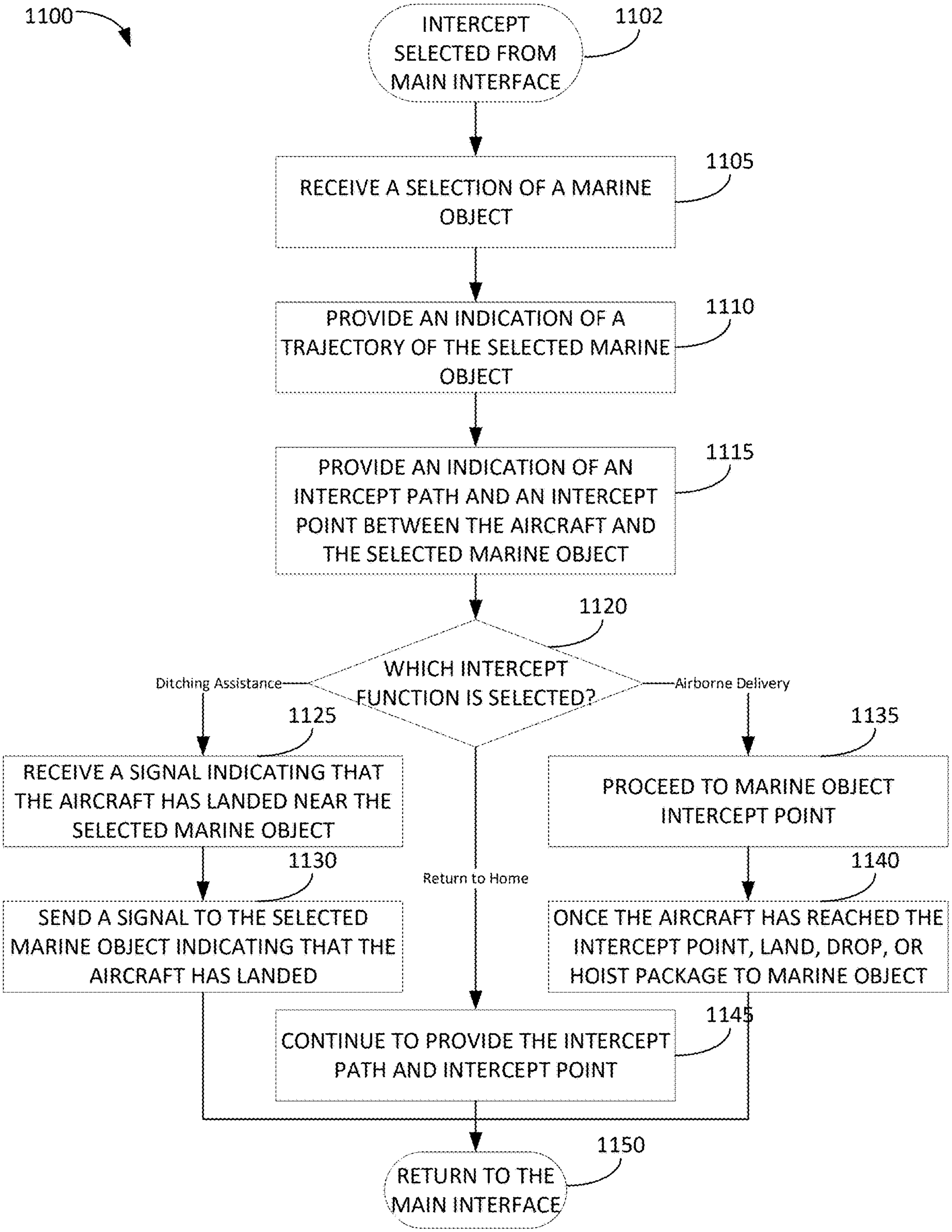
FIG. 11 is a flowchart illustrating a method of providing a user interface with an intercept overlay and for providing several intercept functions, according to some embodiments.

FIG. 11 illustrates a flowchart illustrating a method 1100 of providing a user interface with an intercept overlay and for providing several intercept functions. The method 1100 begins when a system detects that an intercept function has been selected from a main interface (for example, in BLOCK 830 of method 800) (BLOCK 1102). If an intercept function has been selected, the method 1100 includes receiving, by the interface, a selection of a marine object within an area of the aircraft (BLOCK 1105). The method 1100 then includes providing an indication of a trajectory of the selected marine object (BLOCK 1110) and providing an indication of an intercept path and an intercept point between the aircraft and the selected marine object (BLOCK 1115). Following BLOCK 1115, the method 1100 may then make a determination of a selected function incorporating an intercept procedure, for example, an aircraft ditching assistance function, an airborne delivery function, or a return-to-home function (BLOCK 1120).

If the method 1100 detects that an aircraft ditching assistance function has been selected, the method 1100 includes receiving a signal indicating that the aircraft has landed in the vicinity of the selected marine object (BLOCK 1125). Once the method 1100 has determined that the aircraft has landed, the method 1100 includes sending a signal to the selected marine object indicating that the aircraft has landed (BLOCK 1130). In some embodiments, the signal sent to the selected marine object may be a beacon indicating the position of the aircraft. In these embodiments, the beacon may be sent to all marine objects within a range of the beacon. Following BLOCK 1130, the method 1100 ends and returns to a main interface (for example, BLOCK 820 of the method 800) (BLOCK 1150). In some embodiments, the method 1100 may return to a previous block in the method 1100 or wait for a user to exit the aircraft ditching assistance function before returning to the main interface.

If the method 1100 detects that an airborne delivery function has been selected, the method 1100 includes directing an operator of the aircraft to proceed to the intercept point (BLOCK 1135). Once the method 1100 has determined that the aircraft has reached the intercept point, the method 1100 includes either landing on the marine object to deliver a package or another item, dropping the package or another item to the crew, or hoisting the package or another item to the crew (BLOCK 1140). Following BLOCK 1140, the method 1100 ends and returns to a main interface (for example, BLOCK 820 of the method 800) (BLOCK 1150). In some embodiments, the method 1100 may return to a previous block in the method 1100 or wait for a user to exit the airborne delivery function before returning to the main interface.

If the method 1100 detects that a return-to-home function has been selected, the method 1100 includes continuing to provide the intercept path and intercept point until the aircraft has reached the selected marine object (for example, the home vessel of the aircraft) (BLOCK 1145). Following BLOCK 1145, the method 1100 ends and returns to a main interface (for example, BLOCK 820 of the method 800) (BLOCK 1150). In some embodiments, the method 1100 may return to a previous block in the method 1100 or wait for a user to exit the return-to-home function before returning to the main interface.

Figure 12:
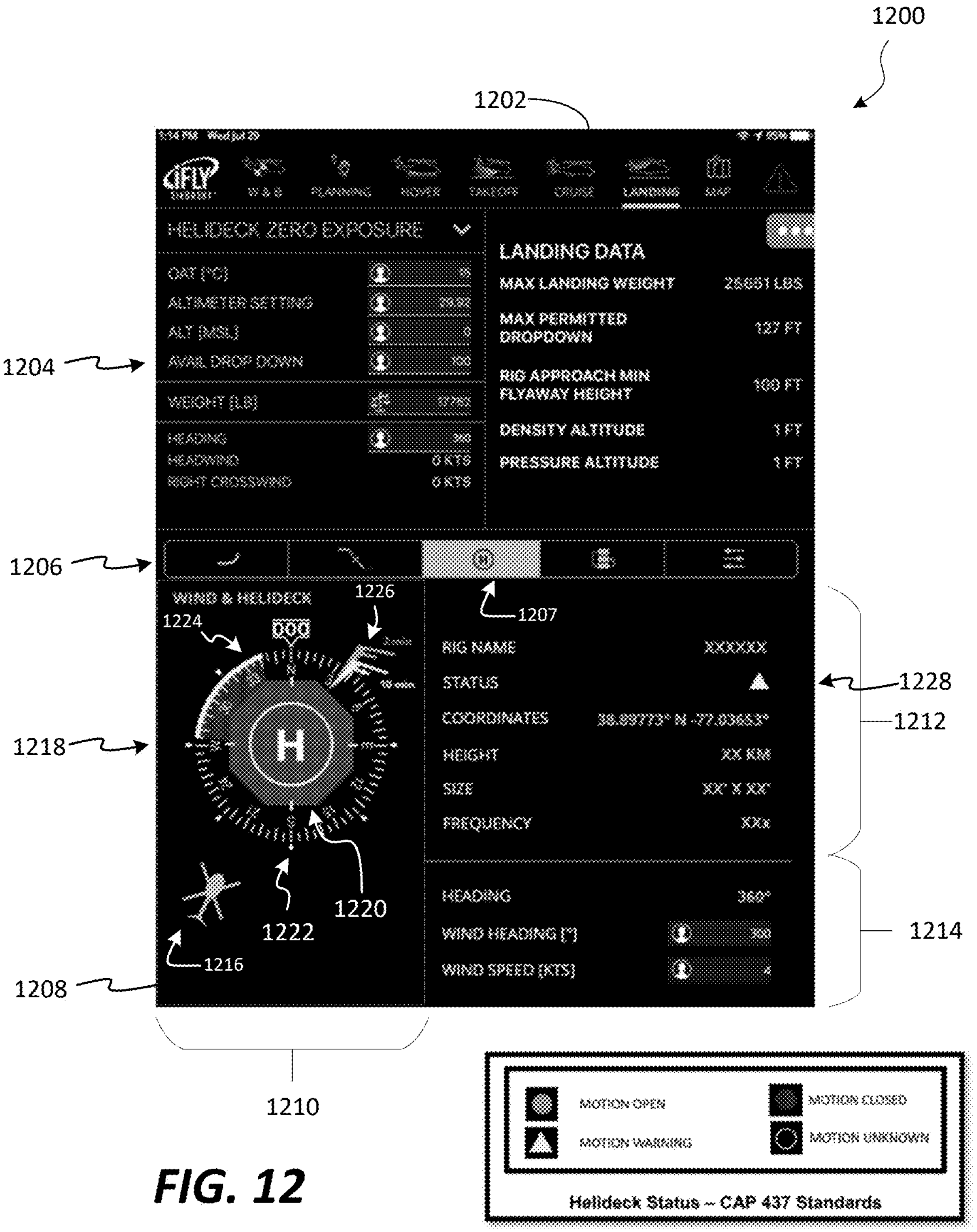
FIG. 12 is an example user interface for depicting helideck flight path tool, according to some embodiments.

FIG. 12 illustrates an example user interface 1200 for displaying a helideck flight path tool. In some embodiments, the helideck flight path tool is implemented by an EFB application executed by the system 200, as described herein. In the example illustrated, the user interface 1200 includes a function tab menu 1202 including a plurality of tabs corresponding to different software utilities related to the functions of the aircraft 105. For example, FIG. 12 illustrates a W&B (weight and balance) tab, a planning tab, a hover tab, a takeoff tab, a cruise tab, a landing tab, and a map tab. In FIG. 12, the landing tab is selected. In the example illustrated, the user interface 1200 also includes a settings panel 1204 related to the selected tab for viewing or setting data related to the corresponding function. The settings panel 1204 may further include an operation selection menu 1206 for selecting a certain operation of the aircraft or a particular function of the EFB application. For example, FIG. 1200 illustrates, among other things, a helideck flight path tool (HFPT) button 1207, which is highlighted to indicate the button was selected (i.e., the HFPT is currently active).

Responsive to the selection of a button from the operation selection menu 1206, the first example user interface 1200 displays a window corresponding to the selected button. For example, in response to the HFPT button 1207 being selected, a HFPT window 1208 is generated. The HFPT window 1208 includes a helideck approach sub-window 1210, a helideck data sub-window 1212, and an approach data sub-window 1214. The data presented in the HFPT window 1208, and its sub-windows relates to a particular helideck. The helideck may be selected by the pilot, for example, by entering an identifier for the desired helideck. In another example, the helideck is selected by the pilot from a plurality of nearby helidecks (for example, based on the location or overall flight plan of the aircraft) presented, for example, by the user interface 155. In some embodiments, the HFPT automatically chooses the closest helideck from the plurality of nearby helidecks (for example, by choosing the nearest helideck based on the current location and/or flight path of the aircraft).

The helideck approach sub-window 1210 includes an ownship indicator 1216 and a helideck approach indicator object 1218. The ownship indicator 1216 is a graphical representation of the aircraft. The graphical representation may be an icon, a shape, or a picture that represents a type of aircraft. In the example illustrated, the ownship indicator 1216 graphical representation is an icon in the shape of a helicopter. The graphical representation may also have other characteristics (e.g., a size or a color) that correspond to characteristics for the aircraft. In some embodiments, the ownship indicator 1216 is displayed relative to the helideck approach indicator object 1218 to indicate the real-world position and heading of the aircraft with respect to the helideck being approached by the aircraft.

The helideck approach indicator object 1218 displays, within a compass ring 1222, a graphical representation 1220 of the helideck being approached by the aircraft. The helideck approach indicator object 1218 includes an obstacle indicator 1224 and one or more wind indicators 1226, each overlaid on the compass ring 1222.

Figure 13:
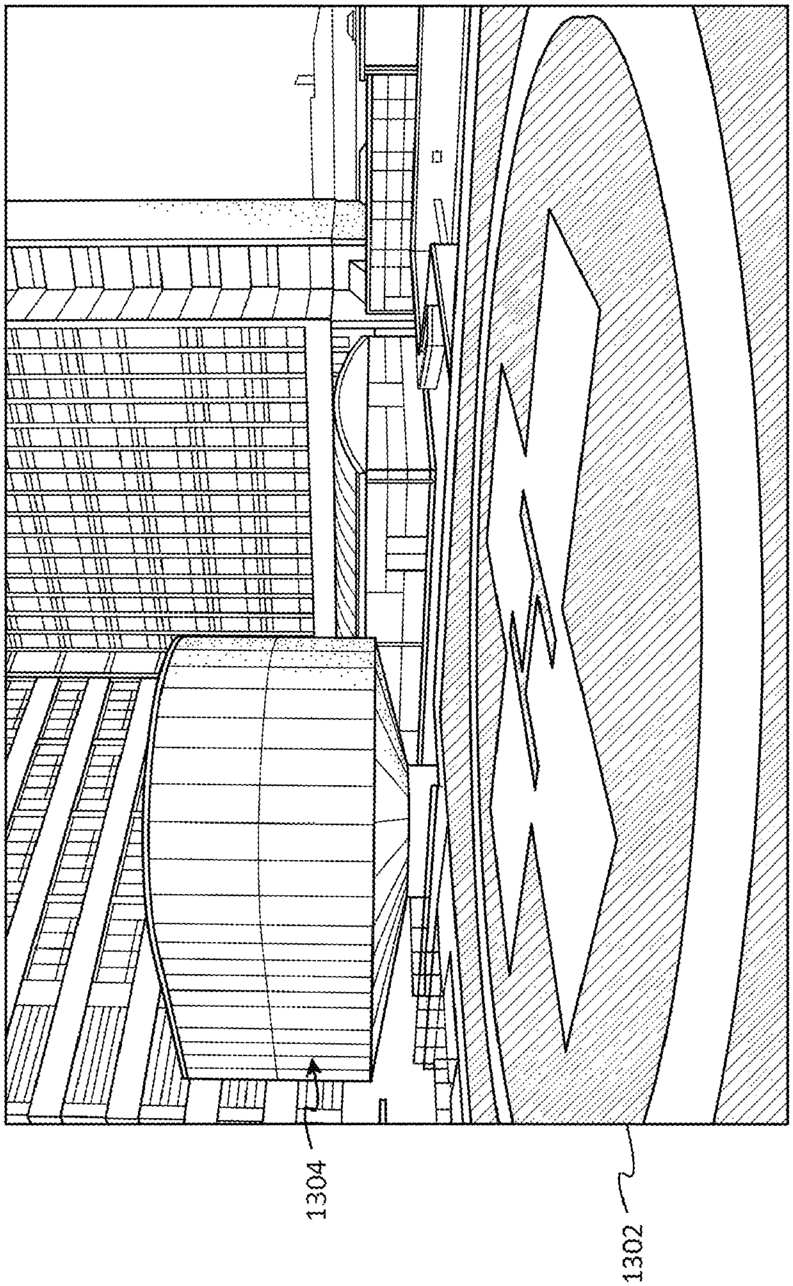
FIG. 13 illustrates an example of a helipad and its environs.

The obstacle indicator 1224 is a graphical indication that provides an indication of an obstacle to landing on the helideck. For example, as illustrated in FIG. 13, a helideck 1302 may be partially surrounded by a structure 1304, which would present an obstacle to aircraft approaching from the direction of the obstacle to land on the helideck 1302. Returning to FIG. 12, the obstacle indicator 1224 highlights an arc on a portion of the circumference of the compass ring 1222. The obstacle indicator 1224 is plotted by azimuth relative to the helideck and corresponding to the compass headings that are blocked by the obstacle. The blocked compass headings may be derived from the obstacle data and helideck data. In some embodiments, the obstacle indicator 1224 is presented in different colors depending on the flight path of the aircraft. For example, when the flight path of the aircraft would place the obstacle between the aircraft and the helideck, the obstacle indicator 1224 may be presented in red. In another example, when the flight path of the aircraft would not place the obstacle between the aircraft on the helideck, the obstacle indicator 1224 may be presented in yellow. In some embodiments, the obstacle indicator 1224 may animate (for example, by glowing, blinking, or pulsating) based on, for example, aircraft heading, aircraft speed (airspeed), aircraft proximity to the obstacle, or a combination thereof. When multiple obstacles are present at a helideck, multiple obstacle indicators can be displayed.

In some embodiments, obstacle indicators are used to provide indications of obstacles that, while not appurtenant to the helideck, nevertheless present on obstacle to the aircraft landing on the helideck from a particular direction or over a particular azimuth range. For example, there may be communication towers located in the vicinity of a helideck that interfere with the vertical flight path of the aircraft. Depending on the height of a tower, the location of the aircraft, the required rate of climb to clear the tower, and the capabilities of the aircraft, it may not be possible for the aircraft to clear the tower and approach the helideck for a landing. In such cases, the obstacle indicator 1224 may be used to alert the pilot of the obstacle.

The wind indicators 1226 present graphical indications of the two minute and ten-minute wind speeds and headings at the helideck. The wind indicators 1226 are overlaid on the compass ring 1222 in positions corresponding to the wind headings. The wind indicators can be sized, shaped, and colored to indicate the wind data (for example, wind speeds, gusts, and other relevant data).

The helideck data sub-window 1212 includes a plurality of data fields for displaying characteristics (helideck data) of the helideck currently being approached by the aircraft. Characteristics include, for example, a helideck's name, coordinates, height, size, and the like. In some embodiments, a helideck status indicator 1228 is presented to indicate the helideck status, for example, according to the Civil Air Publication (CAP) 437 standards. As described herein, in some embodiments, the helideck data is provided by a helideck database.

The approach data sub-window 1214 includes a plurality of data fields for displaying heading information for the ownship and wind heading and speed information for the area surrounding the helideck (for example, as measured by sensors at the helideck and transmitted directly or indirectly to the AVS 130, the computer system 305, or another computing device on board the aircraft and accessible by the EFB application).

As the aircraft makes its approach or otherwise navigates, the ownship indicator 1216 and the helideck approach indicator object 1218 are dynamically updated to reflect changes in the aircraft's location and heading. Similarly, as wind speed data is updated, the wind indicators 1226 are updated. Fields presented in the helideck data sub-window 1212 and the approach data sub-window 1214 are also updated as their underlying data are updated.

Figure 14:
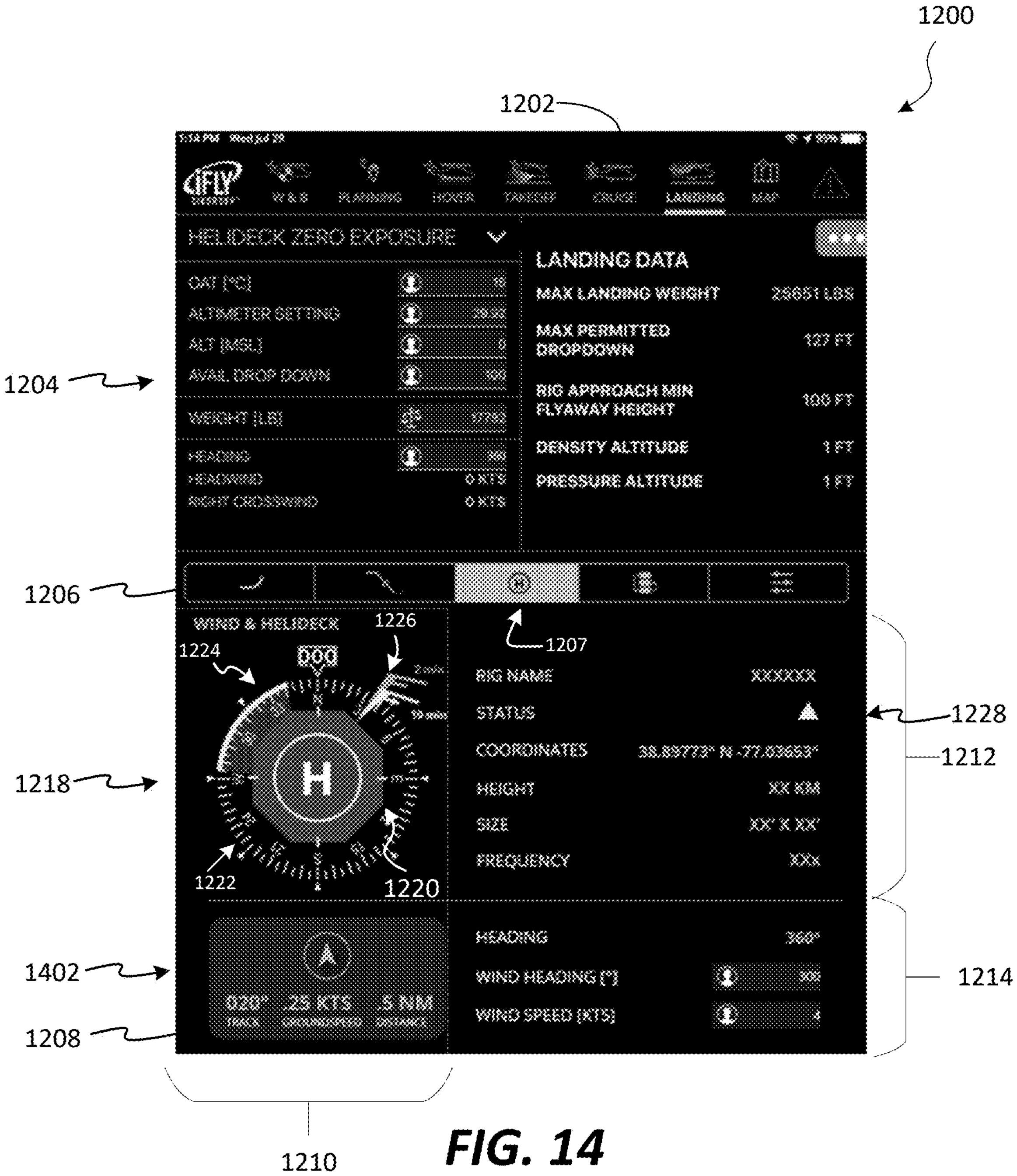
FIG. 14 is an example user interface for depicting helideck flight path tool, according to some embodiments.

FIG. 14 presents an alternative embodiment of the user interface 1200 for displaying a helideck flight path tool. In the illustrated embodiment, the ownship indicator 1216 is replaced with a preferred flight path indicator 1402. The preferred flight path indicator 1402 uses helideck data retrieved from the helideck database (described below) to indicate a preferred flight path for the aircraft to the helideck.

Figure 15:
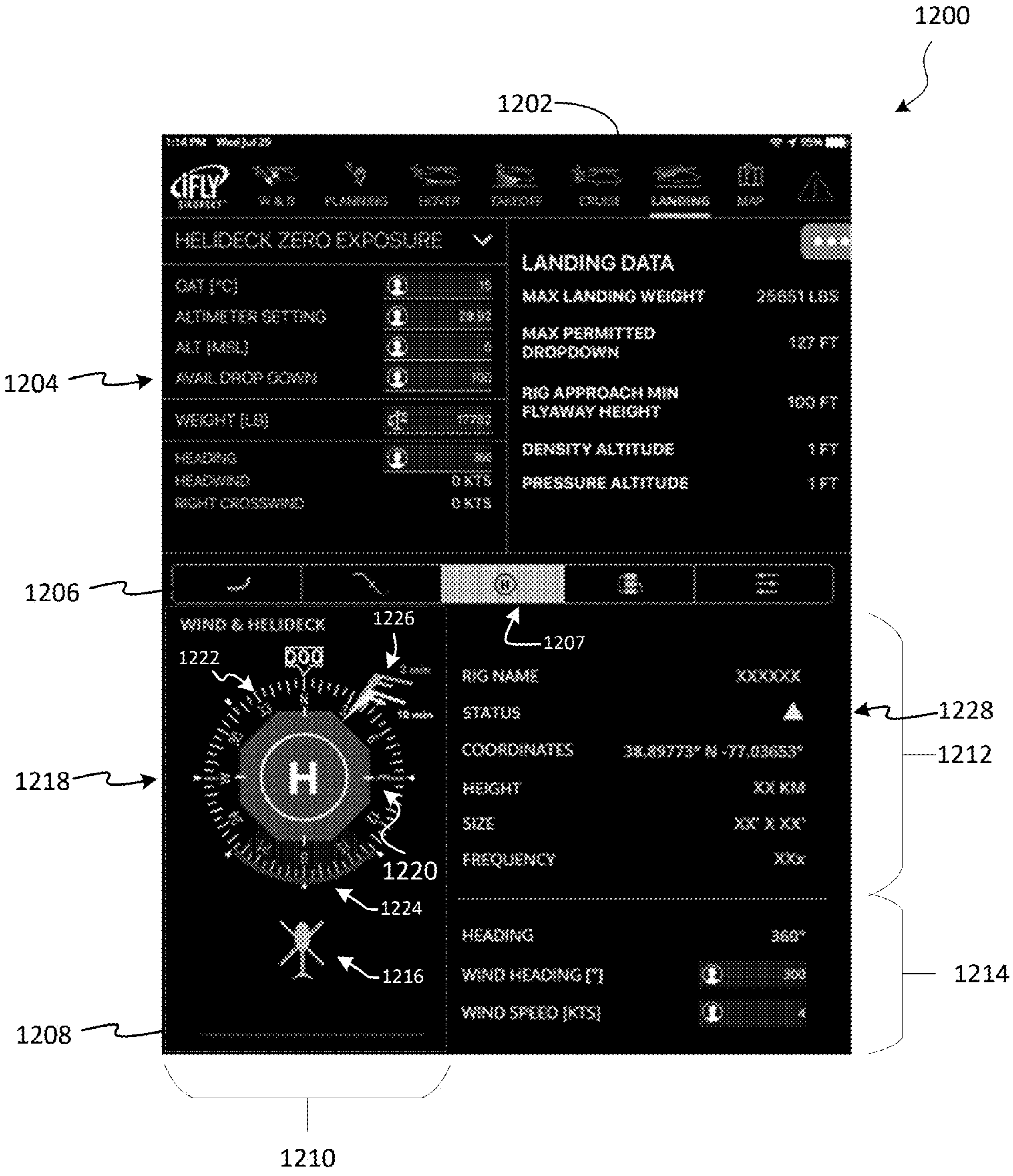
FIG. 15 is an example user interface for depicting helideck flight path tool, according to some embodiments.

FIG. 15 presents another example of the user interface 1200 for displaying a helideck flight path tool. In the illustrated example, the obstacle indicator 1224 is positioned on the compass ring 1222 to indicate that an obstacle is between the aircraft and the helideck.

As described herein with respect to FIGS. 1-3, the aircraft includes or is communicatively coupled to a computer system 305 configured to access one or more systems outside of the aircraft via cellular, satellite, or other communications networks. In some embodiments, the computer system 305 is configured to interface, via one or more networks, a helideck database. The helideck database is an electronic database residing on one or more computer servers. In some embodiments, the helideck database is provided via a cloud computing environment. The helideck database stores helideck data records corresponding to real world helidecks. Each helideck data record stores relevant data on its corresponding helideck, including location data, height data, size data, obstacle data, and other data describing the helideck and its appurtenant structure(s). The helideck data may also include a preferred flight path or paths for use by helicopters approaching the helideck, based on the helideck obstacles and the environment surrounding the helideck. Obstacle data includes obstacle characteristics including, for example, location data, size data, height data, and the like. In some embodiments, the computer system 305 accesses the helideck database as needed while in flight to retrieve data on nearby helidecks. In some embodiments, some or all of the helideck database is cached in a memory of the computer system 305. Similarly, the computer system 305 may retrieve data for other obstacles (for example, communication towers) from obstacle databases or other electronic information sources.

In some embodiments, the EFB application may combine the offshore approach path (OSAP) functions described herein with HFPT to provide a pilot of the aircraft with a total approach path experience. For example, the OSAP functions may display for the pilot while the aircraft approaches the helideck from a range of 7-10 nautical miles out to within about 1 nautical mile of the helideck. As the aircraft approaches within 1 nautical mile of the helideck, the EFB may automatically switch from providing the OSAP functions to providing the HFPT functions.

In some embodiments, variations of the HFPT or other user interface elements described herein may be presented on a heads up or head mounted display to provide the pilot with an augmented or mixed reality display. For example, helidecks and their obstacles may be modeled and displayed in a synthetic vision to the pilots along with indicators of obstructed flight paths, approach paths, wind speed/direction indicators, and the like.

Therefore, embodiments described herein provide systems and methods for detecting marine objects and displaying these marine objects to an operator of an aircraft via an enhanced marine object interface. The enhanced marine object interface may allow for the operator of the aircraft to quickly and efficiently identify marine objects within a vicinity of the aircraft, which enhances safe operations of the aircraft. Other embodiments present systems and methods for helideck flight path depiction within user interfaces displayed via portable and installed aircraft displays. The HFPT helps pilots to understand where obstacles are in relation to a helideck and to determine preferred approach paths and escape paths.

The graphical user interfaces provided herein provide improved user interfaces to, among other things, EFB systems. The improved user interface provides pilots with important flight data and control capabilities though a single interface, resulting in less systems needing to be accessed. This reduces the user interactions required to access necessary data, improves pilot situational awareness, and provides more efficient operation of the aircraft because, among other things, aircraft flight paths do not need to be adjusted or reworked midflight.

Various features and advantages of some embodiments are set forth in the following claims.

What is claimed is:

1. A method for providing situational awareness to a pilot of an aircraft, the method comprising:

determining, with an electronic processor, a helideck identifier identifying a helideck;

retrieving, with the electronic processor, helideck data corresponding to the helideck identifier, the helideck data including a helideck azimuth and an obstacle characteristic for an obstacle to landing on the helideck;

generating a graphical user interface including a helideck approach indicator object including a compass ring, a graphical representation of the helideck aligned to the compass ring based on the helideck azimuth, and an obstacle indicator overlaid on the compass ring based on the obstacle characteristic, the obstacle indicator including an arc having a length corresponding to the compass headings that are blocked by the obstacle based on the heading of the aircraft; and presenting the graphical user interface on a display within the aircraft.

2. The method of claim 1, wherein generating the graphical user interface includes generating a graphical representation of the aircraft positioned relative to the helideck approach indicator object based on a heading of the aircraft.

3. The method of claim 1, further comprising:
receiving, from an avionics system, wind data associated with the helideck, wherein generating the graphical user interface includes generating a wind indicator overlaid on the compass ring based on the wind data.

4. The method of claim 3, further comprising:
overlaying the wind indicator on the compass ring at an azimuth corresponding to a wind heading.

5. The method of claim 4, further comprising:
updating the wind indicator based on a change in at least one selected from the group consisting of the wind data, a location of the aircraft, and a heading of the aircraft.

6. The method of claim 1, further comprising:
altering the appearance of the obstacle indicator based on at least one selected from the group consisting of whether the obstacle is between the aircraft and the helideck, a heading of the aircraft, an airspeed of the aircraft, a change in a location of the aircraft, and a proximity of the aircraft to the obstacle.

7. The method of claim 1, further comprising:
determining, based on a heading of the aircraft, whether the obstacle is between the aircraft and the helideck;
displaying the obstacle indicator in a first color when the obstacle is between the aircraft and the helideck; and
displaying the obstacle indicator in a second color when the obstacle is not between the aircraft and the helideck.

8. The method of claim 1, further comprising:
updating the obstacle indicator based on a change in a location of the aircraft.

9. The method of claim 1, further comprising:
animating the obstacle indicator based on at least one selected from a group consisting of a heading of the aircraft, an airspeed of the aircraft, and a proximity of the aircraft to the obstacle.

10. The method of claim 1, wherein presenting the graphical user interface on a display includes presenting the graphical user interface on one selected from a group consisting of a display integrated into the aircraft, a display of a mobile device in communication with the aircraft, a heads up display, and a head mounted display.

11. A graphical user interface configured to be displayed on a display of a portable computing device, the graphical user interface comprising:
a helideck approach indicator object including:
a compass ring;
a graphical representation of a helideck aligned to the compass ring based on a helideck azimuth; and
an obstacle indicator overlaid on the compass ring based on an obstacle characteristic for an obstacle associated with the helideck, the obstacle indicator including an arc having a length corresponding to the compass headings that are blocked by the obstacle based on the heading of the aircraft.

12. The graphical user interface of claim 11, further comprising:
a graphical representation of the aircraft positioned relative to the helideck approach indicator object based on a heading of the aircraft.

13. The graphical user interface of claim 11, wherein the helideck approach indicator object includes a wind indicator overlaid on the compass ring at an azimuth corresponding to a wind heading.

14. The graphical user interface of claim 13, wherein the wind indicator is updated based on a change in at least one selected from the group consisting of the wind data, a location of the aircraft, and a heading of the aircraft.

15. The graphical user interface of claim 11, wherein the appearance of the obstacle indicator is altered based on at least one selected from the group consisting of whether the obstacle is between the aircraft and the helideck, a heading of the aircraft, an airspeed of the aircraft, a change in a location of the aircraft, and a proximity of the aircraft to the obstacle.

16. The graphical user interface of claim 11, wherein the helideck approach indicator object is presented within a helideck flight path tool window generated in response to a user selection of a helideck flight path tool button.

17. The graphical user interface of claim 16, wherein:
the helideck flight path tool window includes a helideck approach sub-window, a helideck data sub-window, and an approach data sub-window,
the helideck flight path tool window is presented within the helideck approach sub-window,
the helideck data sub-window includes a plurality of data fields for displaying characteristics of the helideck currently being approached by the aircraft, and
the approach data sub-window includes a plurality of data fields for displaying heading information for the aircraft and wind heading and speed information for an area surrounding the helideck.

18. The graphical user interface of claim 11, wherein:
the obstacle indicator is displayed in a first color when the obstacle is between the aircraft and the helideck; and
the obstacle indicator is displayed in a second color when the obstacle is not between the aircraft and the helideck.

19. The graphical user interface of claim 11, wherein the obstacle indicator is updated based on a change in a location of the aircraft.

20. The graphical user interface of claim 11, wherein the obstacle indicator is animated based on at least one selected from a group consisting of a heading of the aircraft, an airspeed of the aircraft, and a proximity of the aircraft to the obstacle.

* * * * *